United States Patent [19]
Maki

[11] Patent Number: 5,587,576
[45] Date of Patent: Dec. 24, 1996

[54] SOLID-STATE IMAGE-SENSING DEVICE AND BAR CODE READER OPERABLE WITH LOW VOLTAGE POWER SUPPLIES AND USING TWO CHARGE TRANSFER DEVICES OF DIFFERENT SIZES

[75] Inventor: Yasuhito Maki, Kanagawa, Japan

[73] Assignee: Sony Corporation, Tokyo, Japan

[21] Appl. No.: 451,060

[22] Filed: May 25, 1995

[30] Foreign Application Priority Data

May 27, 1994 [JP] Japan .................................. 6-138151

[51] Int. Cl.$^6$ ................................................ G06K 7/10
[52] U.S. Cl. .................. 235/462; 235/463; 235/467; 257/239; 257/240; 257/241; 348/312; 348/315
[58] Field of Search ................................ 235/462, 472, 235/463, 467; 257/239, 240, 241; 348/312, 315

[56] References Cited

U.S. PATENT DOCUMENTS

| | | | |
|---|---|---|---|
| 4,488,678 | 12/1984 | Hara et al. | 235/462 X |
| 4,538,060 | 8/1985 | Sakai et al. | 235/472 |
| 4,628,347 | 12/1986 | Sato et al. | 257/241 X |
| 5,225,695 | 7/1993 | Naka et al. | 257/241 X |
| 5,239,192 | 8/1993 | Hirota | 257/240 X |
| 5,286,989 | 2/1994 | Yonemoto | 257/239 |
| 5,303,053 | 4/1994 | Miyatake et al. | 348/312 |
| 5,308,970 | 5/1994 | Pool | 348/312 X |
| 5,309,240 | 5/1994 | Miwada | 257/241 X |
| 5,376,906 | 12/1994 | Nunokawa | 257/241 X |
| 5,452,003 | 9/1995 | Chamberlain et al. | 348/312 X |

FOREIGN PATENT DOCUMENTS 58-141566  8/1983  Japan.
8304344   12/1983  WIPO.

*Primary Examiner*—Donald T. Hajec
*Assistant Examiner*—Michael G. Lee
*Attorney, Agent, or Firm*—William S. Frommer; Alvin Sinderbrand

[57] ABSTRACT

A solid-state image-sensor comprises a sensor, a charge transfer part, a plurality of charge/voltage converters, a comparator and a detector. The sensor has a plurality of arrayed light-receiving portions, with each light-receiving portion converting incident light into a signal charge corresponding to the amount of incident light and accumulating the signal charges. The charge transfer part distributes between at least two systems the signal charge stored at one light-receiving portion part of the sensor and transferring the signal charge using different numbers of stages. The plurality of charge/voltage converters detect and convert into voltages the signal charges of the at least two systems transferred by the charge transfer part. The comparator carries out a level conversion on each of the outputs of the plurality of charge/voltage converters and the detector detects the level transition point of the comparator output signal and generates a binary signal.

14 Claims, 15 Drawing Sheets

W1/L1≒W2/L2

SOLID-STATE IMAGE-SENSING DEVICE AND BAR CODE READER OPERABLE WITH LOW VOLTAGE POWER SUPPLIES AND USING TWO CHARGE TRANSFER DEVICES OF DIFFERENT SIZES

BACKGROUND OF THE INVENTION

1. Field Of The Invention

The present invention relates to a solid-state image sensing apparatus and more particularly to a solid-state image-sensing device equipped with a binary circuit for outputting an image-sense signal as a binary signal and a barcode reading device using this solid-state image-sensing apparatus to read-out, convert to binary signals and output barcodes.

2. Description Of Related Art

Barcodes are information concerning merchandise codes etc. which are displayed usually as combinations of lines of differing sizes on a medium etc. These are then read-out at a XXX or POS (point of sale) etc. and used in the analysis of, for example, the total sales and circulation of merchandise.

CCD image sensors are mainly used as the read-out means for optically reading-out these barcodes. With barcode reading devices using these CCD image sensors, the output of the CCD image sensor is sent to a binary circuit, the combination of lines of different sizes are taken out as binary information and this binary information is then detected. A method for obtaining the binary information where the level (voltage) of an image-sense signal is compared with a threshold voltage at a comparator is usually adopted in the case of this binary processing.

However, while the image-sense signal from the CCD image sensor is being binarized, it is difficult to carry out binary processing for a fixed threshold voltage because the barcode print surface reflections are not uniform due to the influence of depressions or rises in the surface on which the barcode is printed and the influence of light coming from outside.

Because of this, with the barcode reading apparatus of the related art, a circuit built outside of the CCD image sensor chip is used to invert the comparator in the case of a signal level change just before the image-sense signal goes above a fixed absolute value.

The following is a description based on FIG. 19 of a barcode reading device for the related art.

First, a CCD image sensor 100 comprises a sensor row 102 having a plurality of light-receiving portions 101, for converting incident light into signal charges corresponding to the amount of incident light and accumulating the charges, arrayed in a row, and a charge transfer register 104 comprised of CCDs for transferring signal charges read-out from each of the light-receiving portions 101 of the sensor row 102 by a read-out gate 103 in one direction.

A charge/voltage converter 105 made, for example, by floating diffusion region, for detecting the transferred signal charge and converting this signal charge to a voltage is provided at the final stage of the charge transfer register 104.

A buffer circuit 106 comprising, for example, a source follower circuit for performing current amplification on the output of the charge/voltage converter 105 is provided at the post stage of the charge/voltage converter 105. This buffer 106 is formed on the same substrate (chip) as the sensor row 102, the read-out gate 103 and the charge transfer register 104.

Then, a CCD output (image-sense signal) is derived from the output of the buffer 106 and sent to outside via an external terminal 107 to then be sent to a binary circuit 109 after being level-amplified by an amplifier 108. A floating binary circuit etc. employing diodes is used as the binary circuit 109.

This floating binary circuit comprises a comparator 110 and diodes 111 and 112 connected in reverse polarity across the input terminals of the comparator 110. This structure is such that the comparator 110 is inverted in the case of a signal level change just before the image-sense signal exceeds a fixed absolute value.

The input/output characteristics of the binary circuit 109 posses a hysterisis characteristic whereby, as shown in FIG. 20, in the case when the input voltage Vin is, for example, 0 V and the output voltage Vout is, for example, 5 V i.e. the power supply voltage, the output voltage Vout is inverted to 0 V when the input voltage Vin rises from about 0 V to 0.7 V i.e. the level of the diode voltage drop. Alternatively, when the input voltage Vin is, for example, 5 V and the output voltage Vout is 0 V, the output voltage Vout is inverted to 5 V when the input voltage Vin falls by about 0.7 V.

It therefore follows that the output of the binary circuit 109 is inverted when the current signal level of the image-sense signal changes by ±0.7 V or more with respect to the signal level of the previous image-sense signal and this inverted signal can then be taken out as binary information.

A characteristic of this floating binary circuit is that it is possible to carry out binarization using the relative degrees of light and shade of a barcode by capturing changes in a signal as binary.

However, when applications are made in barcode reading devices, in solid-state image-sense devices of the related art including the binary circuit, it is necessary to use an amplifier providing a high degree of amplification as the amplifier 108 for noise countermeasures and a binary circuit 109 employing diodes 111 and 112, which makes the circuit structure complicated and makes manufacture on the same chip as the image sensor 100 i.e. an on-chip structure, difficult to achieve.

Even if the circuit etc. can be made on-chip, giving consideration to the progress in the current situation of low voltage power supply operating voltages for the CCD image sensor 100, for example, 3 V, normal junction-type diodes have a dead-zone in their hysterisis characteristics corresponding to a drop in the voltage level of about 0.7 V. A voltage which is two to three volts larger than 0.7 V or greater is therefore necessary for signal amplification within the sensor and handling this kind of large signal amplification with a 3 V power supply CCD image sensor is extremely difficult.

SUMMARY OF THE INVENTION

As the present invention sets out to resolve the aforementioned problems, it is an object of the present invention to provide a solid-state image-sensing device and a bar-code reading device employing this solid-stage image-sensing device capable of taking binary information without putting a complicated circuit on-chip whilst being compatible with low-voltage operating power supply voltages.

In order to achieve the aforementioned object, according to the present invention, a solid-state image-sensor comprises a sensor, a charge transfer part, a plurality of charge/ voltage converters, a comparator and a detector. The sensor is constructed from a plurality of arrayed light-receiving portions, with each light-receiving portion converting incident light into a signal charge corresponding to the amount of incident light and accumulating the signal charges. The charge transfer part is for distributing between at least two systems the signal charge stored at one light-receiving portion part of the sensor and transferring the signal charge using different numbers of stages. The plurality of charge/voltage converters are for detecting and converting into voltages the signal charges of the at least two systems transferred by the charge transfer part. The comparator is for carrying out a level conversion on each of the outputs of the plurality of charge/voltage converters and the detector is for detecting the level transition point of the comparator output signal and generating a binary signal.

The charge transfer part has a common transfer part for transferring signal charge read-out from the sensor, as is, in units for each light-receiving portion and first and second transfer parts for distributing between at least two systems and transferring the signal charge of one receiver transferred by the common transfer part.

The comparator has a hysterisis characteristic and the plurality of charge/voltage converters are set up in such a manner that at least one reset potential differs from the remaining reset potentials. Each reset potential of the plurality of charge/voltage converters can be independently adjusted.

The solid-state image-sensing device may also be further equipped with a plurality of buffers each having differing input/output characteristics for providing each of the output voltages of the plurality of charge/voltage converters to the comparator. Each of the plurality of buffers are constructed using a source-follower circuit construction with the buffer voltages being set-up at mutually differing values.

Further, according to the present invention, a bar code reading device comprises a light source and an image sensor comprising a sensor, a charge transfer part, a plurality of charge/voltage converters, a comparator and a detector. The sensor is constructed from a plurality of arrayed light-receiving portions, with each receiver converting light, reflected when light is shone from the light source onto a bar-code attached to a medium, into a signal charge corresponding to the amount of reflected light and accumulating the signal charges. The charge transfer part is for distributing the signal charge stored at one receiver part of the sensor between at least two systems and transferring the signal charge using different numbers of stages. The plurality of charge/voltage converters are for detecting and converting into voltages the signal charges of the at least two systems transferred by the charge transfer part. The comparator is for carrying out a level conversion on each of the outputs of the plurality of charge/voltage converters and the detector is for detecting the level transition point of the comparator output signal and generating a binary signal.

The charge transfer part has a common transfer part for transferring signal charge read-out from the sensor, as is, in units for each light-receiving portion and first and second transfer parts for distributing between at least two systems and transferring the signal charge of one receiver transferred by the common transfer part.

The comparator has a hysterisis characteristic and the plurality of charge/voltage converters are set up in such a manner that at least one reset potential differs from the remaining reset potentials. Each reset potential of the plurality of charge/voltage converters can be independently adjusted.

The bar-code reading device may also be further equipped with a plurality of buffers each having differing input/output characteristics for providing each of the output voltages of the plurality of charge/voltage converters to the comparator. Each of the plurality of buffers are constructed using a source-follower circuit construction with the buffer voltages being set-up at mutually differing values.

In the solid-state image-sensing apparatus of the above construction, signal charge read-out from the sensor part by the same light-receiving portion is transferred in the charge transfer part as signal charge for at least two systems, with there being a differing number of transfer stages in each of the two systems. There is therefore a time difference between the signal voltages for the at least two systems outputted from the charge/voltage converters corresponding to the difference in the number of transfer stages.

The signal voltages of the at least two systems possessing a time difference are inputted to a comparator and when the level change between the two signal voltages is greater than a fixed level, the comparator output is changed. A binary signal is then generated by a detector detecting the level transition point of this comparator output.

DETAILED DESCRIPTION OF THE PREFERRED EMBODIES

First Embodiment

The following is a detailed description based on the drawings of the embodiments of the present invention.

Figure 1:
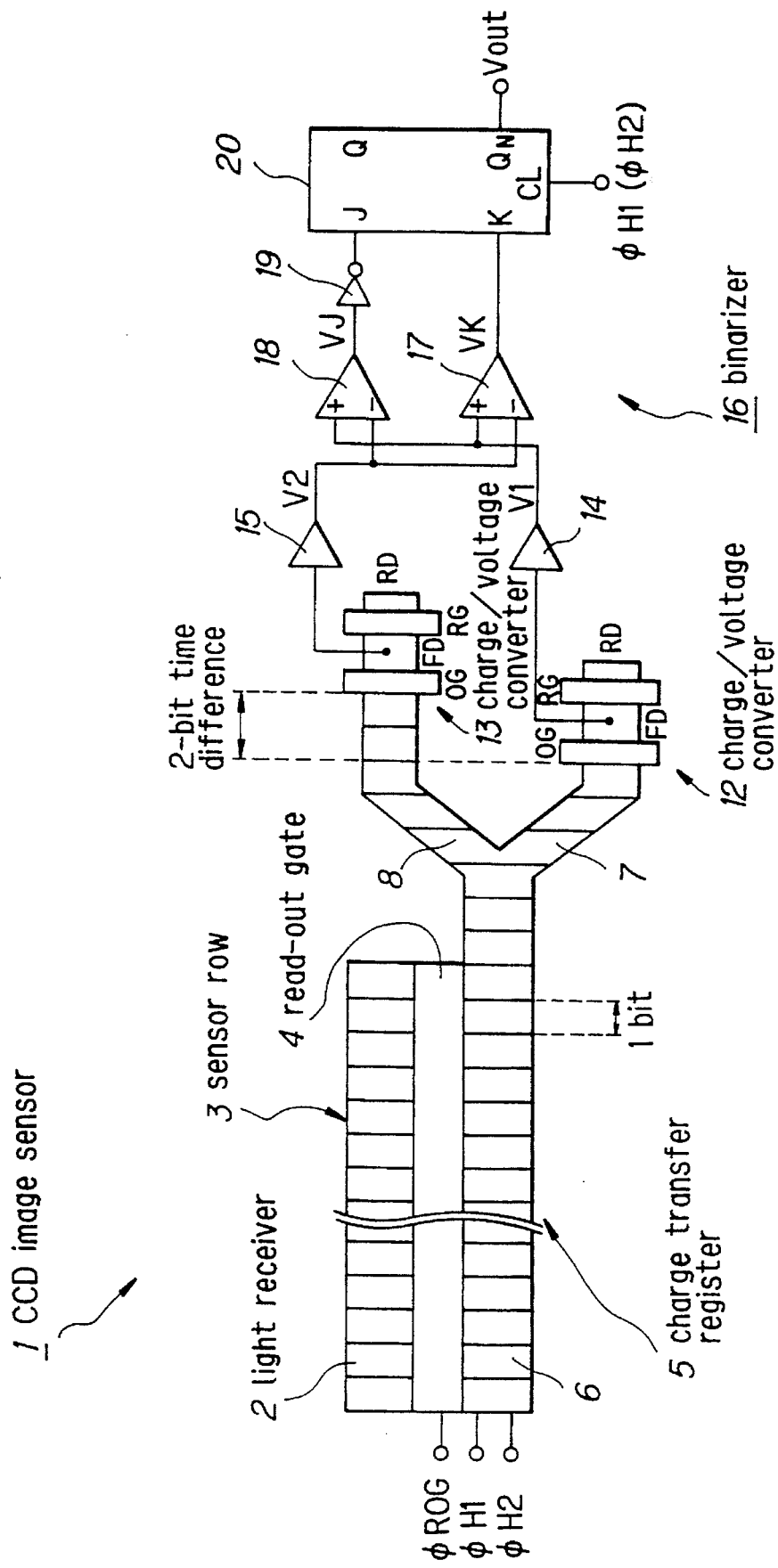
FIG. 1 is a structural view showing a first embodiment of the present invention.

FIG. 1 is a structural view of the first embodiment of the present invention with, for example, a linear sensor being used as an image sensor.

The CCD image sensor 1 of the first embodiment is constructed from a linear sensor (line sensor) comprising a sensor row 3 of a multiplicity of light-receiving portions (pixels) 2 arrayed in a single row for converting incident light into an amount of charge corresponding to the amount of light and accumulating this charge, a read-out gate 4 for reading out signal charges accumulated at each of the light-receiving portions 2 of the sensor row 3 by applying a read-out pulse ROG, and a charge transfer register 5 comprising CCD's for transferring signal charges read-out from the sensor row 3 by the read-out gate 4 in one direction. In this example, this is the right-hand side direction in the diagram.

The charge transfer register 5 is comprised of a common transfer part 6 for transferring signal charges outputted from the sensor row 3 as pixel units without modification and two output side transfer parts 7 and 8 provided on the output side of the charge transfer register 5 which divide into two and transfer signal charges of the same pixels. The construction is two-phase driven by, for example, two-phase transfer clocks clock $\phi H1$ and $\phi H2$.

Figure 2:
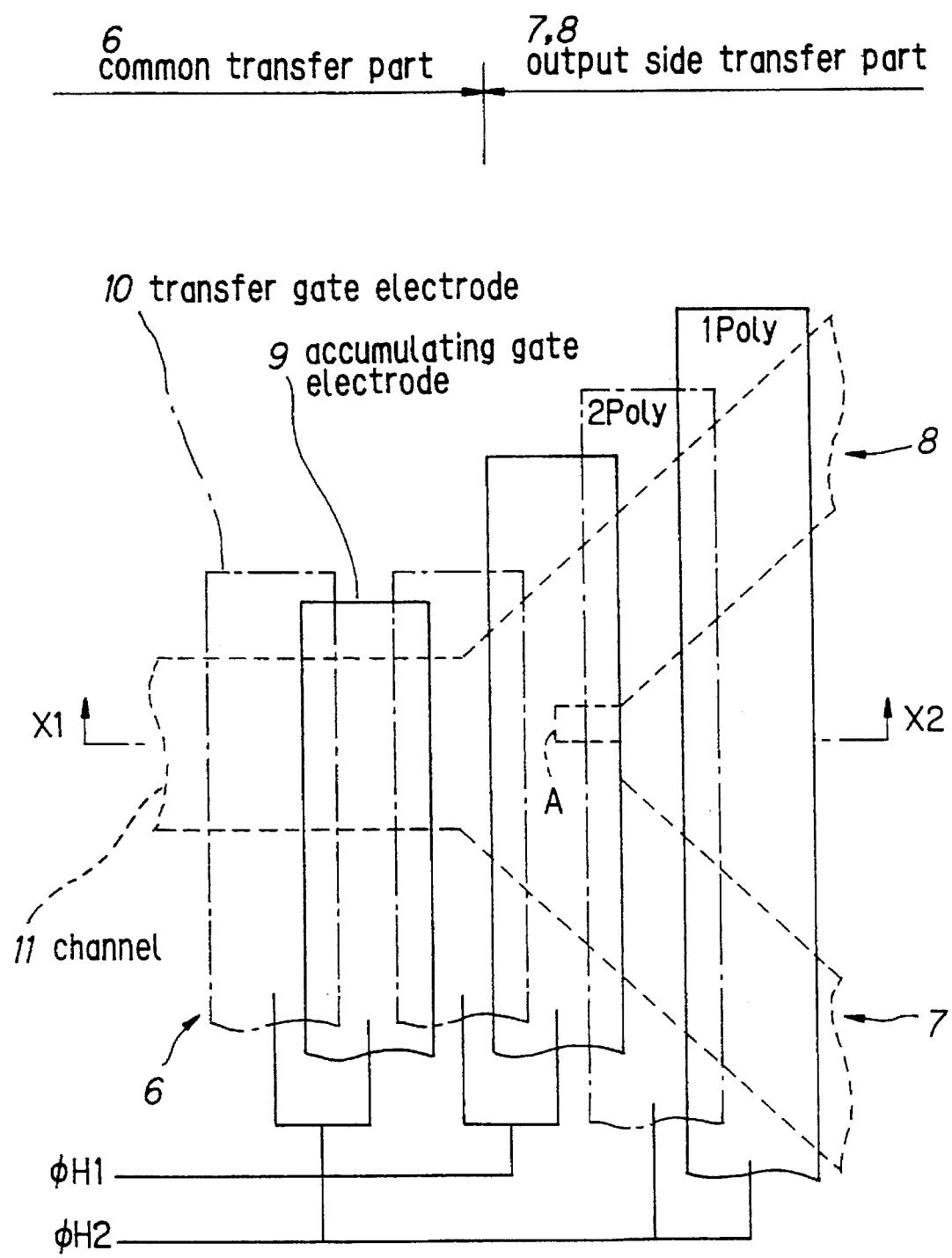
FIG. 2 is a plane pattern view showing the structure in the region of the branch part of the charge transfer register.

The specific structure of the distributed portion of the charge transfer register 5 is shown in FIG. 2. As shown in FIG. 2, at the charge transfer register 5, a two-layer polysilicon (1Poly Si, 2PolySi) accumulating gate electrode 9 and transfer gate electrode 10 comprising an electrode pair are repeatedly arrayed, and transfer clocks fH1 and fH2 are applied to these electrodes.

At the common transfer part 6, the single channel 11 forks within the region of the accumulating gate electrode 9 occurring on the output side of the output of the charge transfer register 5. i.e. the division part A into which the channel 11 divides is positioned with the region of the accumulating gate electrode 9.

Figure 3:
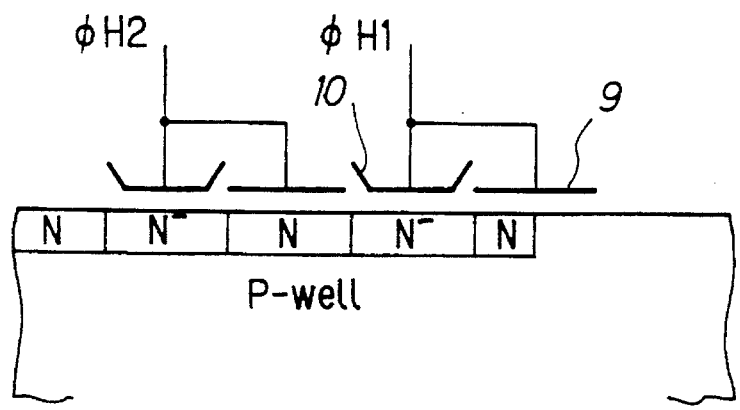
FIG. 3 is a cross-sectional view taken along the line X1–X2 of FIG. 2.
Figure 4:
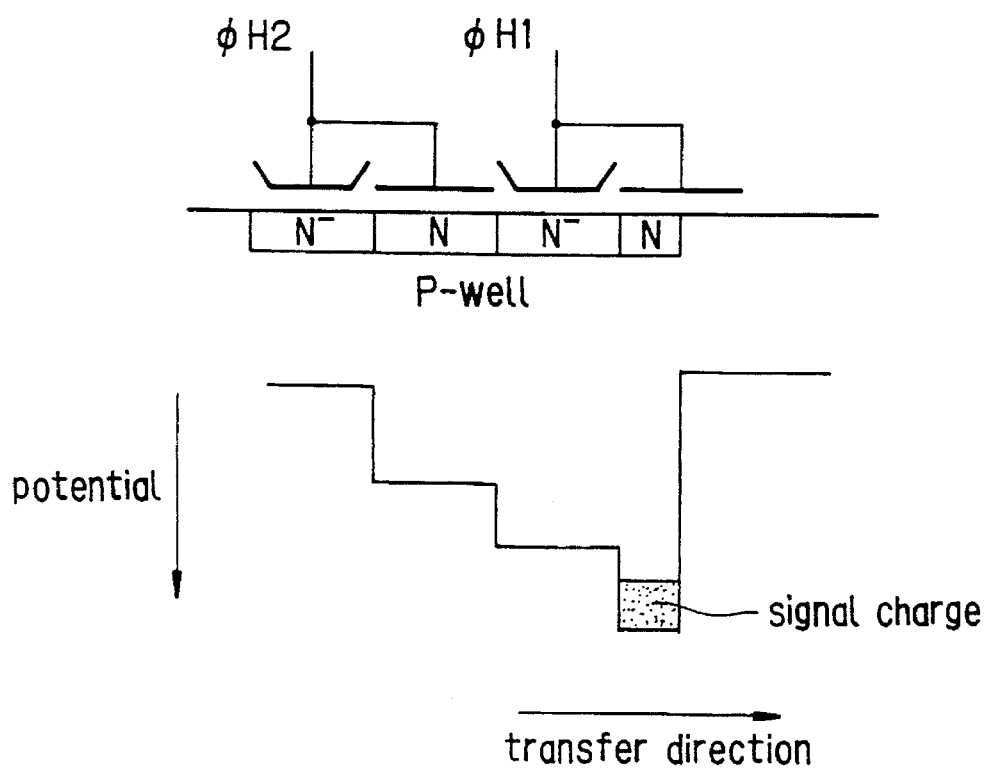
FIG. 4 is a potential view showing the distribution of potential at the plane X1–X2.

FIG. 3 is a cross-sectional view taken along line X1–X2 of FIG. 2 and FIG. 4 shows the potential at this cross-section.

In this embodiment, the division part A which divides the channel 11 is set up so as to be positioned centrally with respect to the width of the channel 11.

In this way, in the signal charge transfer process using pixel units, as shown in FIG. 4, if the same pixel signal charge is transferred within the region of the accumulating gate electrode 9 at which the division part A exists, this same pixel signal charge is divided approximately equally by the existence of the division part A and is provided to the transfer parts 7 and 8 on each output side.

Again in FIG. 1, the two output side transfer parts 7 and 8 are constructed with differing numbers of transfer stages and the same pixel signal load can be transferred in synchronization by applying the transfer clocks $\phi H1$ and $\phi H2$.

In the case in this embodiment, the number of stages of the output side transfer part 8 is set up to be, for example, two stages (two bits) larger than that of the output side transfer part 7. In this way, the same pixel signal loads transferred by the output side transfer parts 7 and 8 have a time difference corresponding to two bits at the final stage.

Charge/voltage converters 12 and 13 for detecting and converting to a voltage signal charges which have been transferred are provided at each of the final stages of the output side transfer parts 7 and 8. Floating diffusion region have been used as the load/voltage converters 12 and 13 in this embodiment. However, the present invention is by no means limited in this respect, and any structure such as a floating gate or amplification detector etc. may be used as long as the signal load is detected and converted to a voltage.

The output voltage of the charge/voltage converter 12 is provided to the binary circuit 16 as a first image-sense signal V1 via a buffer 14 and the output voltage of the charge/voltage converter 13 is provided to the binary circuit 16 as a second image-sense signal V2 via a buffer 15.

The second image-sense signal V2 is delayed by two bits with respect to the first image-sense signal V1 i.e. a period of time corresponding to two transfer clocks, because the number of transfer stages of the output side transfer part 8 is set up to be 2 stages (2 bits) larger than the output side transfer part 7.

The binary circuit 16 is constructed from two comparators 17 and 18, an inverter 19 and a flip-flop 20.

With the binary circuit 16 of this embodiment, the two comparators 17 and 18 are wired so that the first image-sense signal V1 from the buffer 14 is inputted to the "+" side input terminals and the second image-sense signal V2 from the buffer 15 is inputted to the "−" side input terminals. The comparators 17 and 18 are constructed so as to only work during the signal section of each of the pixel signals and not respond during the reset period.

Weightings are given to the two inputs of the comparators 17 and 18 so that a hysterisis characteristic is present whereby the output voltage VK goes low at the comparator 17 when a signal of the same potential is inputted to the "+" side input terminal and the "−" side input terminal and the output voltage VJ goes high at the comparator 18 when a signal of the same potential is inputted to the "+" side input terminal and the "−" side input terminal. A detailed description of the specific circuit structure for providing this weighting is given later.

This weighting is used as a noise margin at the time of binarization. i.e. if the weighting (Vx) is set up so that the output voltage VK at the comparator 17 only goes high when the first image-sense signal V1 rises above the second image-sense signal V2 by just a constant voltage Vx and the output voltage VJ at the comparator 18 only goes low when the first image-sense signal V1 falls below the second image-sense signal V2 by just a constant voltage Vx, the comparators 17 and 18 will not respond to changes less than the fixed voltage Vx (infinitesimal fluctuations due to noise) and each of the output conditions will be maintained.

A JK flip-flop circuit with, for example, a transfer clock $\phi H1$ ($\phi H2$) provided to the clock terminal CL is used as the flip-flop circuit 20. The output VJ of the comparator 18 is inverted by the inverter 19 and inputted at the J terminal of this JK flip-flop and the output VK of the comparator 17 is wired so as to be directly inputted to the terminal K. A binarized output Vout is then taken from the output terminal $Q_N$ (inversion of Q) of the JK flip-flop circuit 20.

The JK flip-flop circuit 20 may be constructed mainly from, for example, CMOS transistors and may also be formed on the same substrate (on-chip) as the sensor row 3 of the CCD image sensor 1, the read-out gate 4 and the charge transfer register 5.

Figure 5:
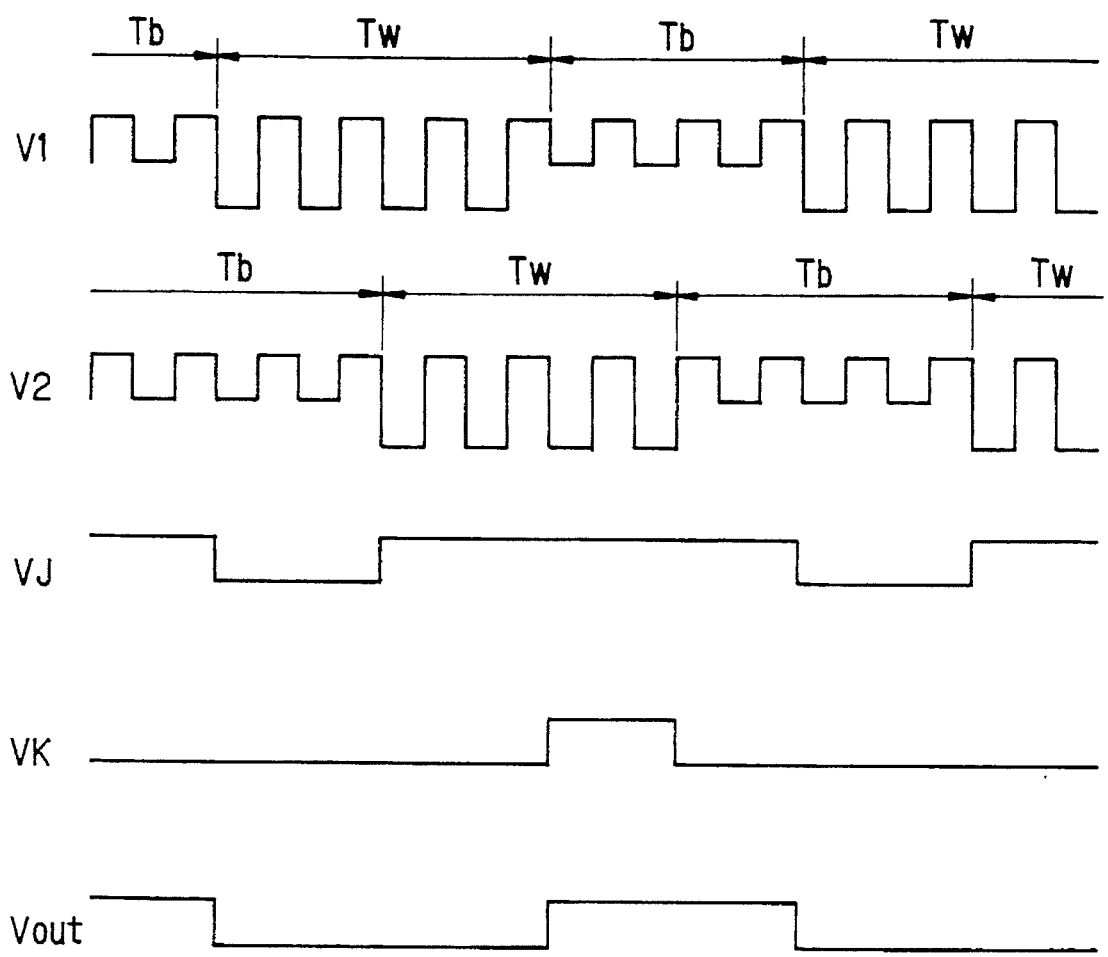
FIG. 5 is a signal waveform diagram for describing the operation of a first embodiment of the present invention.

FIG. 5 is a view showing the wave-shapes of the first and second image-sense signals V1 and V2, each of the output voltages VK and VJ of the comparators 17 and 18 and the binarized output Vout.

Next, a description will be given, with reference to the signal wave diagram of FIG. 5, of the signal processing operation occurring at the binary circuit 16 of the aforementioned construction.

First, in FIG. 1, the signal waveform of the second image-sense signal V2 taken from the charge/voltage converter 13 via the buffer 15 is a signal waveform which is 2 bits, i.e. 2 transfer clocks, slower than the first image-sense signal V1 taken from the charge/voltage converter 12 via the buffer 14. With regards to these image-sense signals V1 and V2, black information is shown in the section Tb and white information is shown in the section Tw.

With regards to the waveform for the output voltage VJ outputted from the comparator 18, the output becomes low only when the signal level of the first image-sense signal V1 is more than a fixed voltage Vx lower than the signal level of the second image signal and goes high only when this level is equal to or greater than the signal level of the second image signal. This is because the comparator 18 is weighted, as already described, with a fixed voltage Vx. This output voltage VJ is inverted by the inverter 19 and inputted to the J terminal of the JK flip-flop 20.

On the other hand, with regards to the waveform of the output voltage VK outputted from the comparator 17, the output only goes high when the signal level of the first image-sense signal V1 exceeds the signal level of the second image-sense signal V2 by the fixed voltage Vx or greater and goes low when the level is the same or lower. This output voltage VK is inputted to the J terminal of the JK flip-flop 20.

The signal waveform for the binary output Vout present at the output $Q_N$ of the JK flip-flop 20 goes high at the point in time when the output voltage VK of the comparator 17 synchronized with the clock CL goes high with the output voltage VJ of the comparator 18 being high and the J terminal input being low, and goes low at the point in time when the output voltage VJ of the comparator 18 goes low and the J terminal input goes high.

The binary voltage Vout outputted from the JK flip-flop 20 is a binarized version of the first image-sense signal V1, as becomes apparent when the waveshapes V1 and Vout are compared. Black and white corresponding to information taken from the sensor row 3 of the CCD image sensor 1 can therefore be discerned to a high degree of accuracy based on this binary voltage Vout.

An inverted binary voltage $Vout_N$ can then be obtained using the Q output of the JK flip-flop 20.

As described above, according to the structure of the first embodiment, the transfer parts 7 and 8 can be made in places which are somewhat separated on the pattern layout because the charge transfer register 5 branches into two on the output side so as to split the pixel signal charge into two, with the number of transfer stages at the transfer parts 7 and 8 at the head of each branch being made to be different. Circuit types such as the buffers 14 and 15 etc. can therefore easily positioned crosswise with respect to the charge/voltage converters 12 and 13 so as to make an on-chip construction on the same substrate as the CCD image sensor 1 a possibility.

Figure 6:
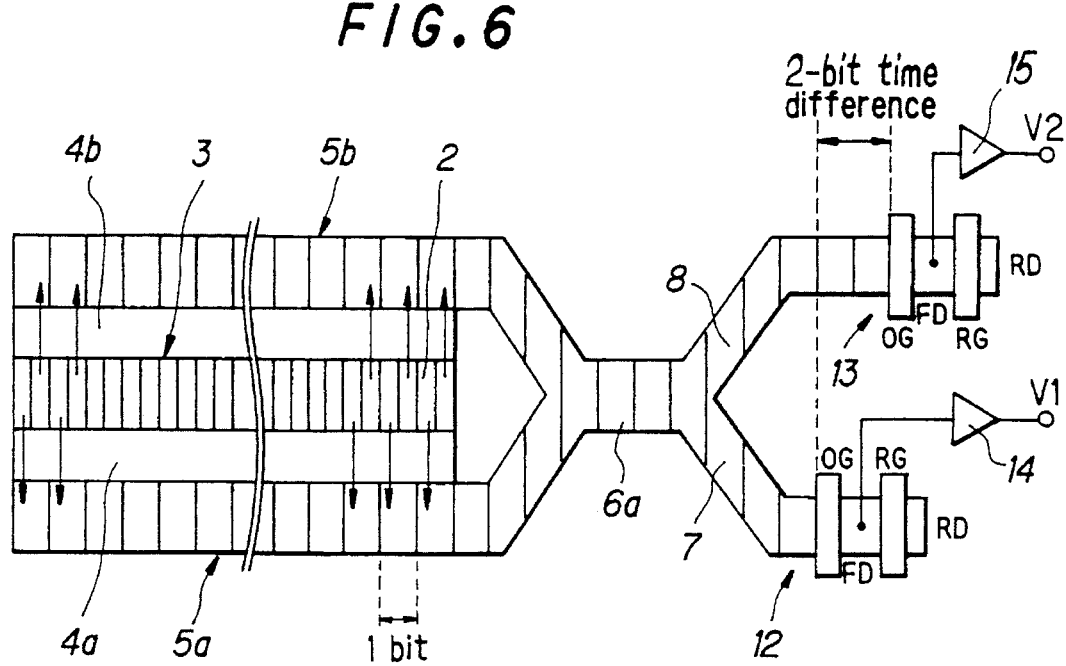
FIG. 6 is a structural view showing a first modification of the first embodiment.

FIG. 6 is a structural view showing a first modification of the aforementioned first embodiment, with portions which are the same as portions in FIG. 1 being given the same numerals.

In the CCD image sensor of the first modification, charge transfer registers 5a and 5b are positioned on both sides of the sensor row 3. Signal charges accumulated at the light-receiving portions 2 for each one pixel of the sensor row 3 are read-out to the charge transfer registers 5a and 5b via read-out gates 4a and 4b.

The charge transfer registers 5a and 5b come together on the output side into a single common transfer part 6a.

In this way, signal charges read from the sensor row 3 via the read-out gates 4a and 4b and transferred as pixel units by the charge transfer registers 5a and 5b are transferred in a sequence corresponding to the arraying of the light-receiving portions 2 of the sensor row 3 at the common transfer part 6a.

The output side of the common transfer part 6a branches into two transfer parts 7 and 8 positioned on the output side in the same way as the first embodiment with these branched portions being structured in the same way as those in the first embodiment (refer to FIG. 2). The output side transfer parts 7 and 8 are structured so as to have a different number of transfer stages with the signal charge of the same pixel distributed between the two systems being transferred in synchronization.

In this modification, the number of transfer stages in the output side transfer part 8 is set up to be, for example, two stages (two bits) more than that of the output side transfer part 7.

In this way, the signal charges for the same pixel transferred by the output side transfer parts 7 and 8 posses a time difference corresponding to two bits at the final stage.

Charge/voltage converters 12 and 13 for detecting and converting into voltages the transferred signal charges are provided at the final stages of each of the output side transfer parts 7 and 8 and are constructed by, for example, floating diffusion region.

In this first modification it is also possible to make the transfer parts 7 and 8 in places on the pattern layout which are somewhat separated and therefore easily position circuits such as the buffers 14 and 15 across the width of the charge voltage converters 12 and 13. This is because, as in the first embodiment, the output side charge transfer register branches into two so that the signal charge for the same pixel is split up and then transferred.

Also, by adopting a read-out structure where reading out of the signal charge for each of the light-receiving portions 2 in the sensor row 3 is carried out from both sides, the array pitch of the light-receiving portions 2 can be set up to be ½ of the bit (transfer stage) pitch of the charge transfer registers 5a and 5b. The pixel number can therefore be doubled and the resolution improved.

Figure 7:
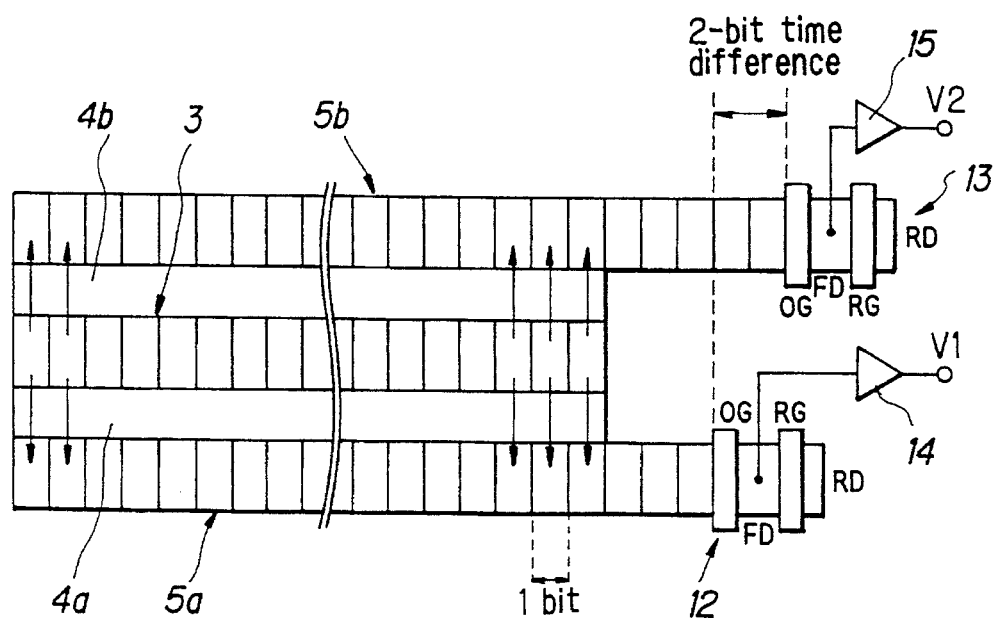
FIG. 7 is a structural view showing a second modification of the first embodiment.

FIG. 7 is a structural view showing a second modification of the aforementioned first embodiment, with portions which are the same as portions in FIG. 6 being given the same numerals.

With the CCD image sensor of this second modification, charge transfer registers 5a and 5b are provided on both sides of the sensor row 3. The structure is such that signal charges accumulated for the same pixel at the light-receiving portions 2 of the sensor row 3 are read-out to the charge transfer registers 5a and 5b via the read-out gates 4a and 4b by being divided approximately into two.

Here, in order to divide signal charge accumulated at the light-receiving portions 2 for the same pixel into approximately two at the time of reading out, it is necessary to provide a device for setting up, for example, the potential at the region for accumulating signal charge in such a manner so as to be at it's most shallow at the central portion of the read-out direction i.e. the vertical direction in the drawing, with the potential then gradually becoming deeper as the read-out gates 4a and 4b are approached.

The charge transfer registers 5a and 5b are made so as to have different transfer stage numbers and signal charges for the same pixel read out via the read-out gates 4a and 4b are transferred in synchronization.

In this modification, the number of transfer stages for the charge transfer register 5b is set up to be 2 stages (two bits) more the that for the charge transfer register 5a.

The signal charge for the same pixel transferred by the charge transfer registers 5a and 5b posses a time difference corresponding to two bits at the final stage.

Charge/voltage converters 12 and 13 for detecting the transferred signal charge and changing this signal charge to a voltage, made using, for example, floating diffusion region, are provided at each of the final stages for the charge transfer registers 5a and 5b.

In the case of this second modification, as in the case of the first embodiment, the construction is such that signal charge accumulated for the same pixel is distributed as signal charge for two systems and then transferred by charge transfer registers 5a and 5b having differing numbers of transfer stages within each system. It is therefore possible to make the charge transfer registers 5a and 5b in places on the pattern layout which are somewhat separated and circuits such as the buffers 14 and 15 can easily be provided crosswise across the charge/voltage converters 12 and 13.

In this second modification, the signal charge for the same pixel is split-up between two systems and read out using the stages for reading out signal charges from the light-receiving portions 2. It is therefore necessary for the pitch of the sensor row 3 and the bit (transfer stage) pitch of the charge transfer registers 5a and 5b to be the same so that the number of pixels cannot be increased. However, as in the case of the first modification, the signal charge distributed using pixel units can be gathered together and as it is not necessary to have a structure where the signal charge for the same pixel is again distributed between two systems and a charge transfer system structure which is simpler than that of the first modification is therefore possible.

Next, a description is given, with reference to FIG. 8 to FIG. 11, of several typical examples of specific circuit structures for providing weighting at the comparators 18 (17).

Figure 8:
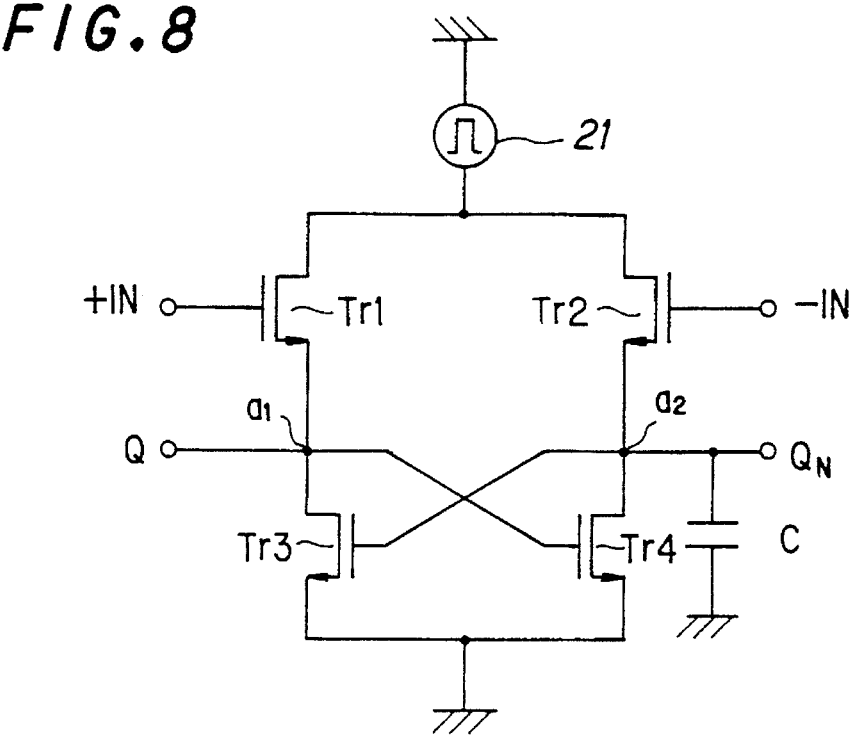
FIG. 8 is a circuit diagram showing a first example of a comparator.

First, the first example shown in FIG. 8 has two n-channel MOSFET's (hereinafter referred to simply as the first and second MOS transistors Tr1 and Tr2), having their drain electrodes connected in common and two n-channel MOSFET's (hereinafter referred to simply as the third and fourth MOS transistors Tr3 and TR4) connected in series with each of the MOS transistors Tr1 and Tr2.

The main part of the construction is an RS flip-flop circuit where a Q terminal is derived from a common connection point $a_1$ of the first and third MOS transistors Tr1 and Tr3 to which the gate electrode of the fourth MOS transistor Tr4 is connected and a $Q_N$ terminal is derived from a common connection point $a_2$ of the second and fourth MOS transistors Tr2 and Tr4 to which the gate electrode of the third MOS transistor Tr3 is connected.

A clock generating source 21 is connected between the point where the first and second MOS transistors Tr1 and Tr2 are connected in common and earth and each of the source electrodes of the third and fourth MOS transistors Tr3 and Tr4 are connected to earth. A capacitor C is connected between the common connection point $a_2$ of the second and fourth MOS transistors Tr2 and Tr4 and earth. The gate electrode of the first MOS transistor Tr1 is derived as the "+" side input terminal "+IN" and the gate electrode of the second MOS transistor Tr2 is derived as the "−" side input terminal "−IN".

The threshold voltage of the second MOS transistor Tr2 in this first example of a circuit structure becomes high depending on the charge accumulated at the capacitor C.

In this way, the threshold voltages of the first MOS transistor Tr1 into which the first image-sense signal V1 is inputted and the second MOS transistor Tr2 into which the second image sense signal V2 is inputted become unbalanced. The result of this is that the portion of the threshold voltage added at the second MOS transistor Tr2 is equivalently added with respect to the signal level inputted at the + side input terminal +IN.

A capacitor C is connected across the common connection point $a_1$ of the first and third MOS transistors Tr1 and Tr3 in the case of the comparator 17, although this is not shown in the drawings, so that the threshold voltage of the first MOS transistor Tr1 depends upon the charge accumulated at the capacitor C. According to the same theory as for the above case, the added portion of the threshold voltage of the first MOS transistor Tr1 is equivalently added with respect to the level of the signal inputted at the − side input terminal −IN.

Figure 9:
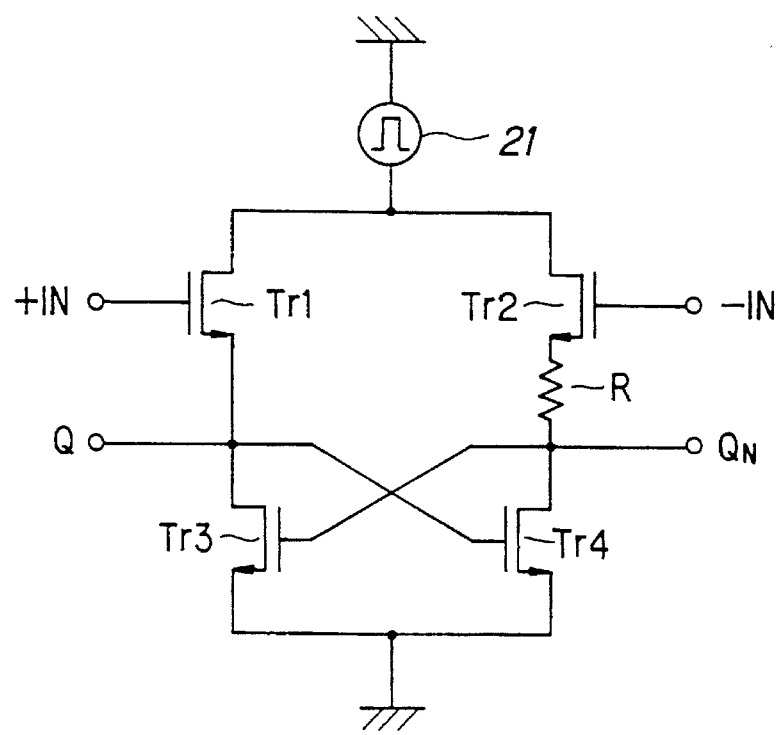
FIG. 9 is a circuit diagram showing a second example of a comparator.

Next, as shown in FIG. 9, the structure for a second example of the comparator 18 has a construction which is basically almost the same as that of the first example. However, the capacitor C connected across the common connection point $a_2$ of the second and fourth MOS transistors Tr2 and Tr4 has been removed and instead a resistance R has been introduced across the source electrode of the second MOS transistor Tr2 and the drain electrode of the fourth MOS transistor Tr4.

The threshold voltage of the first MOS transistor Tr1 into which the first image-sense signal is inputted and the second MOS transistor Tr2 into which the second image-sense signal V2 is inputted are also effectively unbalanced in this second example circuit structure due to the voltage drop at the resistance R. The threshold voltage portion added at the second MOS transistor Tr2 is therefore equivalently added with respect to the level of the signal inputted at the + signal input terminal IN.

Now, although not shown in the drawings, in the case of the comparator 17, the threshold voltages of the first MOS transistor Tr1 into which the first image-sense signal V1 is inputted and the second MOS transistor Tr2 into which the second image-sense signal V2 is inputted are effectively unbalanced by the introduction of a resistance R across the source electrode of the first MOS transistor Tr1 and the drain electrode of the third MOS transistor Tr3. The additional threshold voltage portion added at the first MOS transistor Tr1 is therefore equivalently added with respect to the level of the signal inputted at the − side input terminal −IN.

Figure 10:
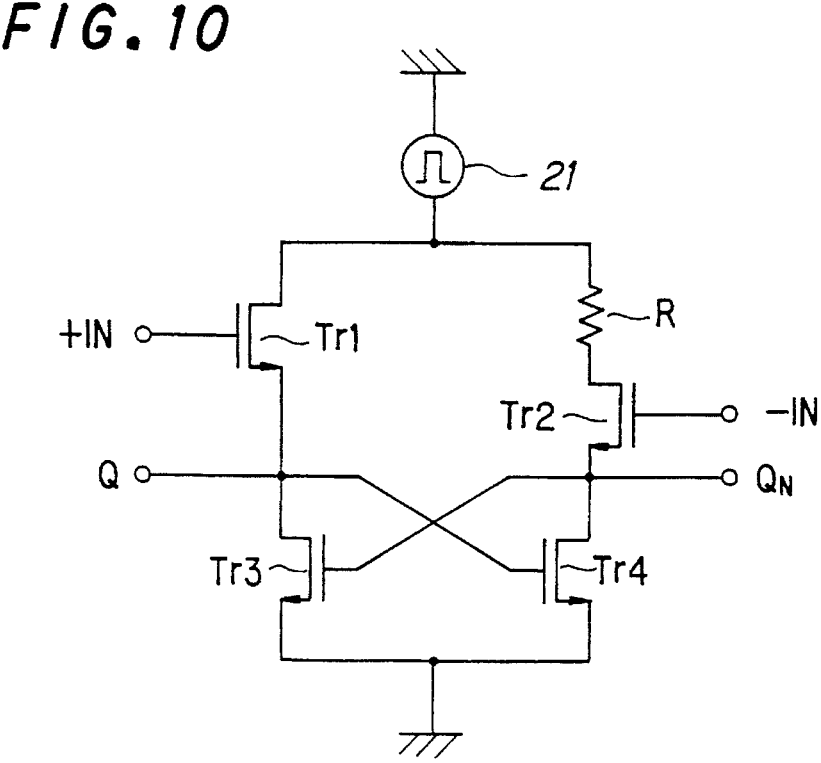
FIG. 10 is a circuit diagram showing a third example of a comparator.
Figure 11:
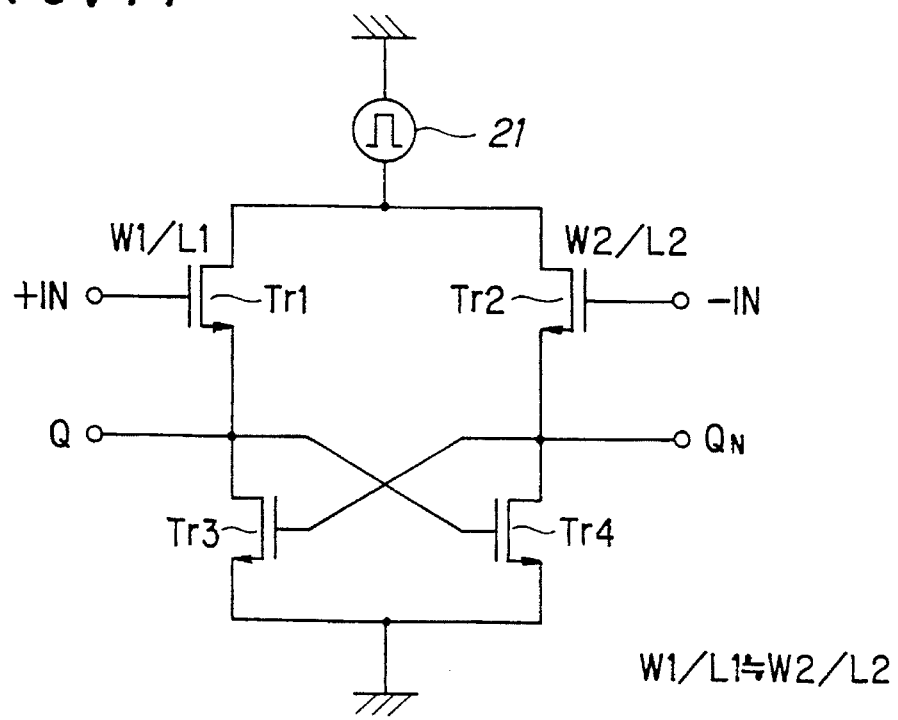
FIG. 11 is a circuit diagram showing a fourth example of a comparator.

Next, a structure for a third example of the comparator 18 shown in FIG. 10 has almost the same structure as the second example, but differs from the second example in that the resistance R is introduced on the drain side of the second MOS transistor Tr2.

The threshold voltages of the first MOS transistor Tr1 into which the first image-sense signal V1 is inputted and the second MOS transistor Tr2 into which the second image-sense signal V2 is inputted are also effectively mnbalanced in this third example circuit structure and the threshold voltage portion added at the second MOS transistor Tr2 is equivalently added with respect to the level of the signal inputted at the + side input terminal +IN.

Although not shown in the drawings, in the case of the comparator 17, the threshold voltages of the first MOS transistor Tr1 into which the first image-sense signal V1 is inputted and the second MOS transistor Tr2 into which the second image-sense signal is inputted are effectively unbalanced by introducing the resistor R on the drain side of the first MOS transistor Tr1. The threshold voltage portion added at the first MOS transistor Tr1 is therefore added equivalently with respect to the level of the signal inputted at the − side input terminal −IN.

Next, a fourth example of the comparators 17 and 18 has almost the same construction as the first example. However, the capacitor C connected across the common connection point $a_2$ of the first and fourth MOS transistors Tr2 and Tr4 is removed and instead the ratio W1/L1 of the channel width W1 and the channel length L1 at the first MOS transistor Tr1 and the ratio W2/L2 of the channel width W2 and the channel length L2 of the second MOS transistor Tr2 are intentionally made so as to be different.

The threshold voltages of the first MOS transistor Tr1 into which the first image-sense signal V1 is inputted and the second MOS transistor Tr2 into which the second image-sense signal V2 is inputted are also unbalanced in the fourth example structure. The threshold voltage portion added at the second MOS transistor Tr2 or the first MOS transistor Tr2 transistor is therefore added equivalently with respect to the + side input terminal +IN or the − side input terminal −IN.

As a modification of the fourth example, a structure may also be adopted where the ratio W3/L3 of the channel width W3 and the channel length L3 of the third MOS transistor Tr3 and the ratio W4/L4 of the channel width W4 and channel length L4 of the fourth MOS transistor Tr4 are intentionally made so as to differ.

The threshold voltages of the first MOS transistor Tr1 into which the first image-sense signal V1 is inputted and the second MOS transistor Tr2 into which the second image-sense signal V2 is inputted are also unbalanced in this modification. The threshold voltage portion added at the second MOS transistor Tr2 or the first MOS transistor Tr2 transistor is therefore added equivalently with respect to the + side input terminal +IN or the − side input terminal −IN.

Second Embodiment

Figure 12:
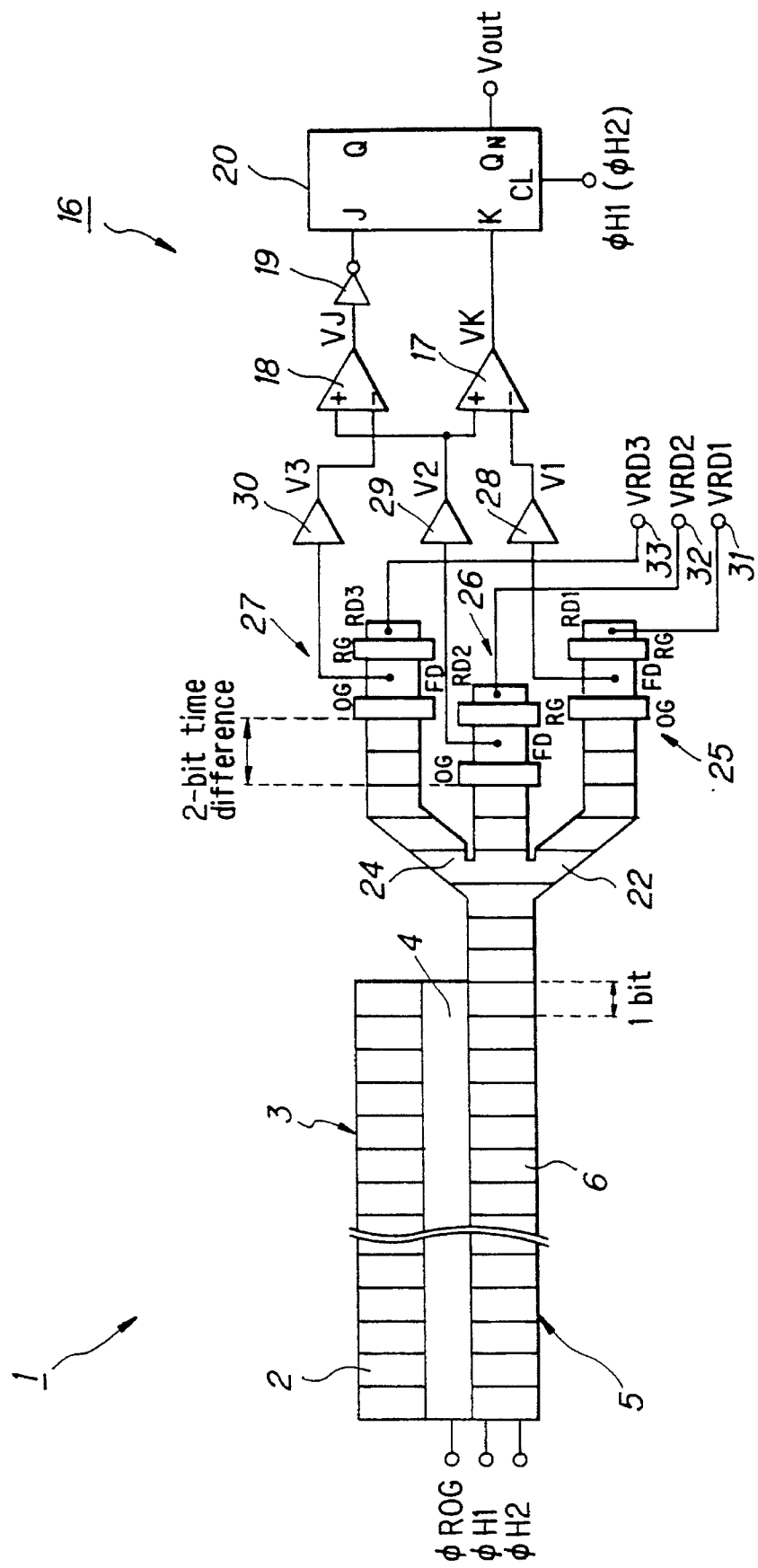
FIG. 12 is a structural view showing a second embodiment of the present invention.

FIG. 12 is a structural view showing a second embodiment of the present invention, with portions in the drawings which are equivalent to portions in FIG. 1 being given the same numerals.

In this second embodiment, the charge transfer register 5 comprises a common transfer part 6 for transferring signal charge read from the sensor row 3 as is in pixel units, and three output side transfer parts 22, 23 and 24 for distributing signal charge for the same pixel between three systems by splitting up the charge transfer register 5 into three on the output side and then transferring the charges.

At the output side transfer parts 22, 23 and 24, the number of transfer stages of the output side transfer part 22 and the output side transfer part 24 are set up to be the same and the number of stages in the output side transfer part 23 is set up to be, for example, two stages (two bits) less than the number of stages of the output side transfer parts 22 and 24.

Charge/voltage converters 25, 26 and 27 for detecting transferred signal charge and converting this signal charge to a voltage constructed using, for example, floating diffusion region, are provided at each of the last stages of the output side transfer parts 22, 23 and 24.

The output voltages of the charge/voltage converters 25, 26 and 27 are outputted to the binary circuit 16 as first, second and third image-sense signals V1, V2 and V3 via the buffers 28, 29 and 30, respectively.

The first and third image signals V1 and V3 are delayed by a period of time corresponding to two bits i.e. two transfer clocks with respect to the second image-sense signal V2 which is taken as a reference because the number of transfer stages of the output side transfer part 23 is set up to be two bit portions less than the number of transfer stages of the output side transfer parts 22 and 24.

The binary circuit 16 comprises two comparators 17 and 18 having the same characteristics, an inverter 19 and a flip-flop 20.

The wiring of the binary circuit 16 of this embodiment is such that the second image-sense signal V2 from the buffer 29 is inputted to the + side input terminals of the comparators 17 and 18, the first image-sense signal V1 from the buffer 28 is inputted to the − side input terminal of the comparator 17 and the third image-sense signal V3 from the buffer 30 is inputted to the − side input terminal of the comparator 18. The two comparators 17 and 18 are constructed so as to only operate during the signal sections of each of the pixel signals and not respond during the reset period.

A JK flip-flop circuit with, for example, a transfer clock φH1 (φH2) provided to the clock terminal CL is used as the flip-flop circuit 20. The output VJ of the comparator 18 is inverted by the inverter 19 and inputted at the J terminal of this JK flip-flop and the output VK of the comparator 17 is wired so as to be directly inputted to the terminal K. A binarized output Vout is then taken from the output terminal $Q_N$ (inversion of Q) of the JK flip-flop circuit 20.

Figure 13:
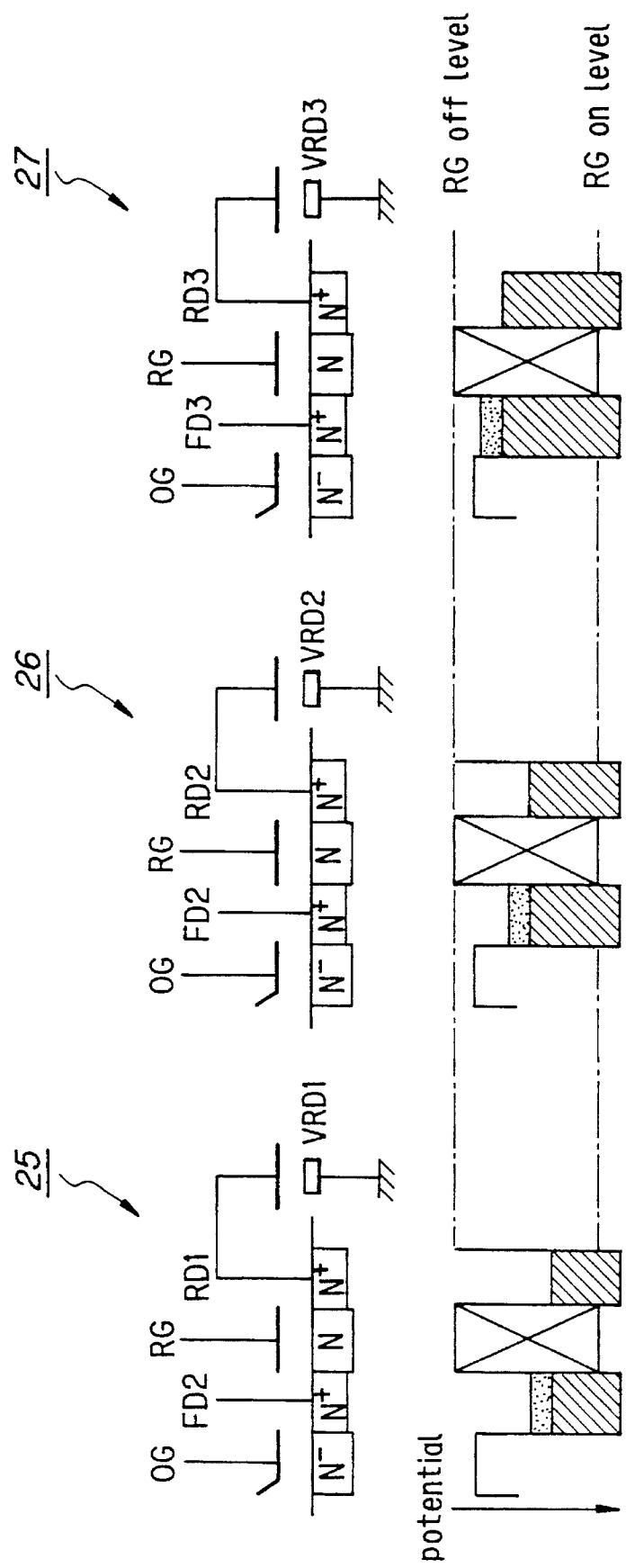
FIG. 13 is a view showing the potential of a charge/voltage detector of the second embodiment.

In this embodiment, the respective reset drains RD1, RD2 and RD3 of the charge/voltage converters 25, 26 and 27 of a floating diffusion region structure are set up to have differing reset potentials VRD1, VRD2 and VRD3 (VRD1>VRD2>VRD3). Specifically, the reset potential VRD2 is taken as a reference and setting-up is carried out so that, when the weighting is taken to be Vx, VRD1=VRD2+Vx and VRD3=VRD2−Vx. The potential distribution of the charge/voltage converters 25, 26 and 27 in this case is shown in FIG. 13.

In this way, an operation equivalent to the giving of a weighting using the comparators 17 and 18 of the first embodiment can be obtained because the offset levels, for example, the reset levels VRD1', VRD2' and VRD3' after the buffering, of the respective output voltages are different.

As described above, according to the structure of the second embodiment, signal charge for the same pixel is distributed between three systems and transferred, converted to voltages by three charge/voltage converters 25, 26 and 27 and the reset potential of at least one of the respective reset potentials VRD1, VRD2 and VRD3 of the three charge/voltage converters 25, 26 and 27 is made to differ from the remaining reset potentials. It is therefore no longer necessary for the comparators 17 and 18 including the buffers 28 to 30 to be unbalanced.

The two comparators 17 and 18 and the three buffers 28 to 30 may therefore have the same characteristics and the characteristics of the overall circuit can be stabilized.

The weighting process may also be carried out by intentionally making the characteristics of the circuit unbalanced when viewed from the + side input terminal and the − side input terminal of the comparators 17 and 18 as described based on FIG. 8 to FIG. 11. However, in this case, it is difficult to set-up the weighting Vx accurately due to variations in the wafer process, making the weightings Vx between the devices different.

However, in this second embodiment, weighting where variations are almost non-existent can be achieved by limiting variations due to the wafer process etc. by making at least one of the respective reset voltages VRD1, VRD2 and VRD3 of the three charge/voltage converters 25, 26 and 27 different.

Also, if the wiring for the reset drains RD1, RD2 and RD3 is derived as RD external terminals 31, 32 and 33, the value of the weighting Vx can easily be externally controlled and binary sensitivity adjustments can be carried out.

Next, the operation of the construction of the second embodiment is described with reference to the signal wave diagrams in FIG. 14.

First, in FIG. 12, the signal waveform of the second image-sense signal V2 read from the charge/voltage converter 26 via the buffer 29 is delayed by two bits (i.e. two transfer clocks) with respect to the waveforms for the first image-sense signal V1 read from the charge voltage converter 25 via the buffer 28 and the third image signal V3 read from the charge/voltage converter 27 via the buffer 30. The sections Tb of these image-sense signals V1, V2 and V3 show black information and the sections Tw show white information.

Here, the waveform of the output voltage VK of the comparator 17 goes high only when the signal level of the second image-sense signal V2 falls below the signal level of the first image-sense signal V1 by an amount greater than the weighting Vx, and goes low at times other than this. This is because, in this second embodiment, setting-up is carried out so that VRD1 (=VRD2+Vx )>VRD2>VRD3 (=VRD2−Vx ). This output voltage VK is inputted to the K terminal of the JK flip-flop 20.

On the other hand, the waveform of the output voltage VJ of the comparator 18 only goes low when the signal level of the second image-sense signal V2 falls below the signal level of the image-sense signal V3 by an amount greater than the weighting Vx, and goes high at other times. This output voltage VJ is inverted by the inverter 19 and inputted to the J terminal of the JK flip-flop circuit 20.

In this example, the output is unsettled when the + side input terminal and the − side input terminal are of the same potential because the comparators 17 and 18 posses the same characteristics.

With the output voltage VJ of the comparator 18 being high so that the J terminal input is low, when the output voltage VK of the comparator 17 goes high, the binary output Vout present at the output $Q_N$ of the JK flip-flop 20 goes high, and when the output voltage VJ of the comparator 18 goes low and the J terminal input goes high, the binary output Vout goes low.

Figure 14:
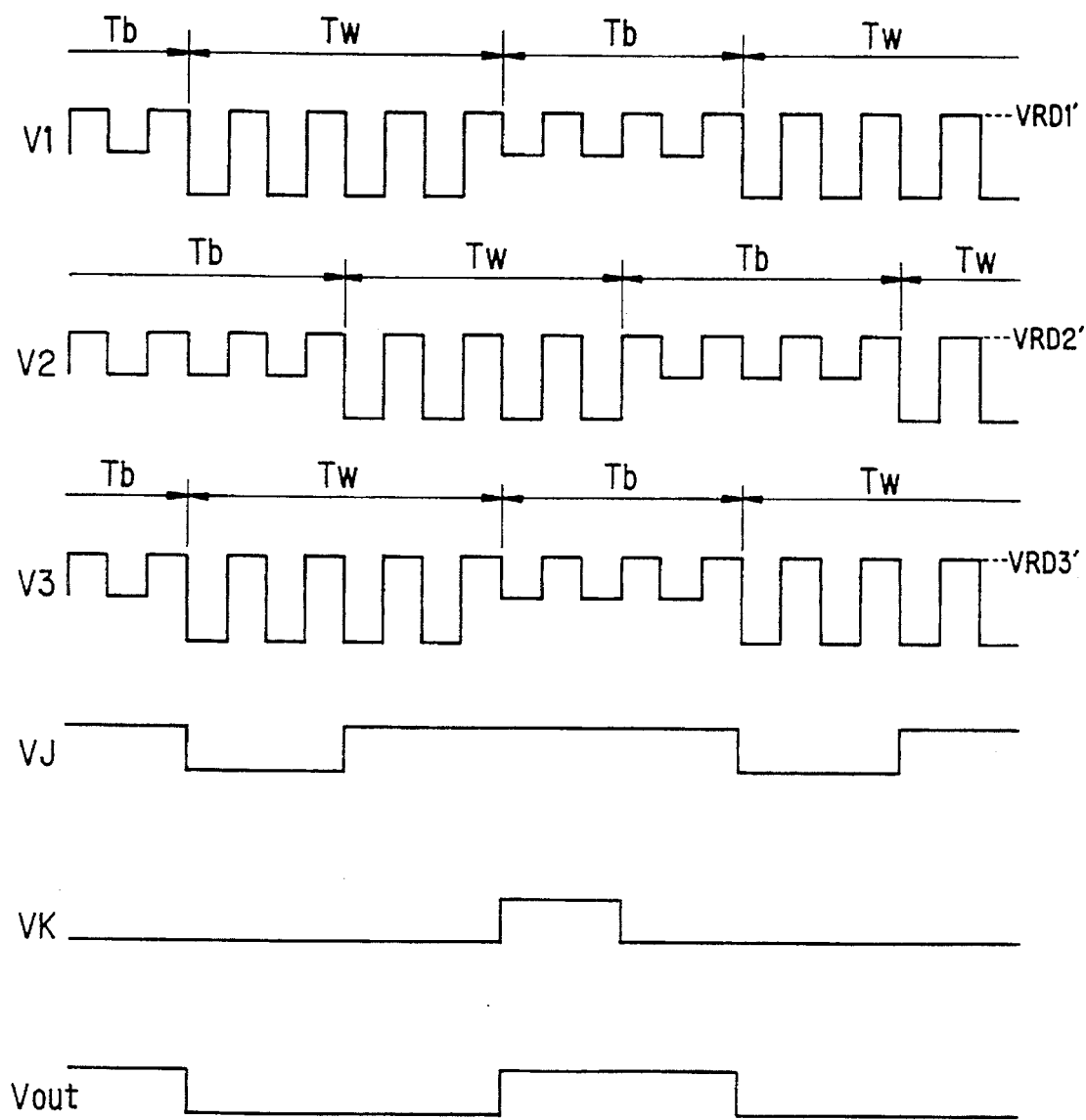
FIG. 14 is a signal waveform diagram for describing the operation of the second embodiment.

As becomes clear by comparing the waveforms V1 and V3 and the waveform Vout of FIG. 14, the binary voltage Vout outputted from the JK flip-flop circuit 20 is a binarized version of the first and third image-sense signals V1 and V3. Information corresponding to black and white information read from the sensor row 3 of the CCD image sensor 1 can therefore be discerned with a high degree of precision based on this binary voltage Vout.

Third embodiment

Figure 15:
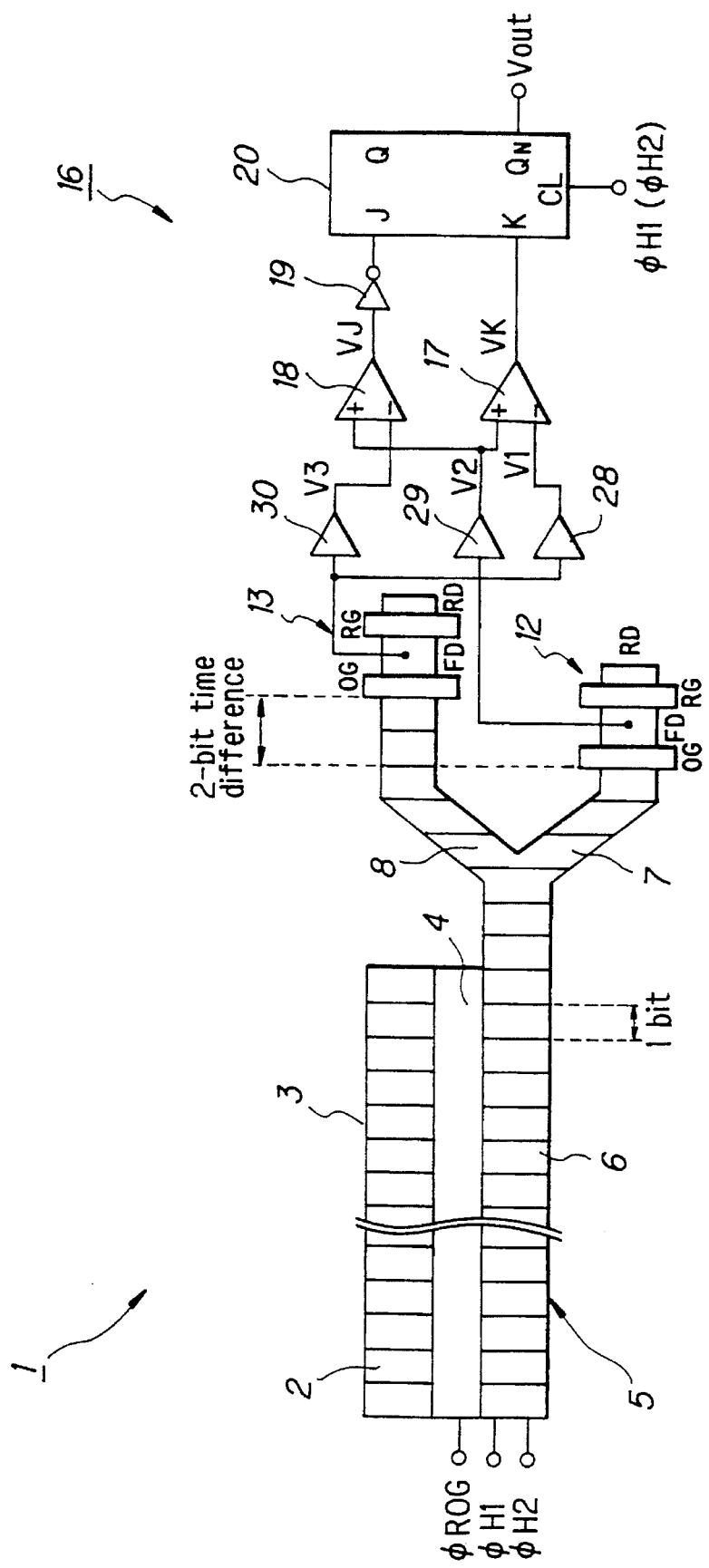
FIG. 15 is a structural view showing a third embodiment of the present invention.

FIG. 15 is a structural view showing a third embodiment of the present invention with portions equivalent to portions in FIG. 1 being given the same numerals.

In this third embodiment, the charge transfer register 5 divides into two on the output side so as to distribute signal charge for the same pixel. Transfer parts 7 and 8 having transfer stage numbers which differ as in the structure in the first embodiment at the head of each branch. Three buffer 28, 29 and 30 are provided for the charge/voltage converters 12 and 13. The output voltage of the charge/voltage converter 12 is taken out via the buffer 29 as the second image-sense signal V2 to be taken as a reference, with the output voltage of the charge/voltage converter 13 being taken out via the buffer 28 as the first image-sense signal V1 and being taken out via the buffer 30 as the third image-sense signal V3.

Figure 16:
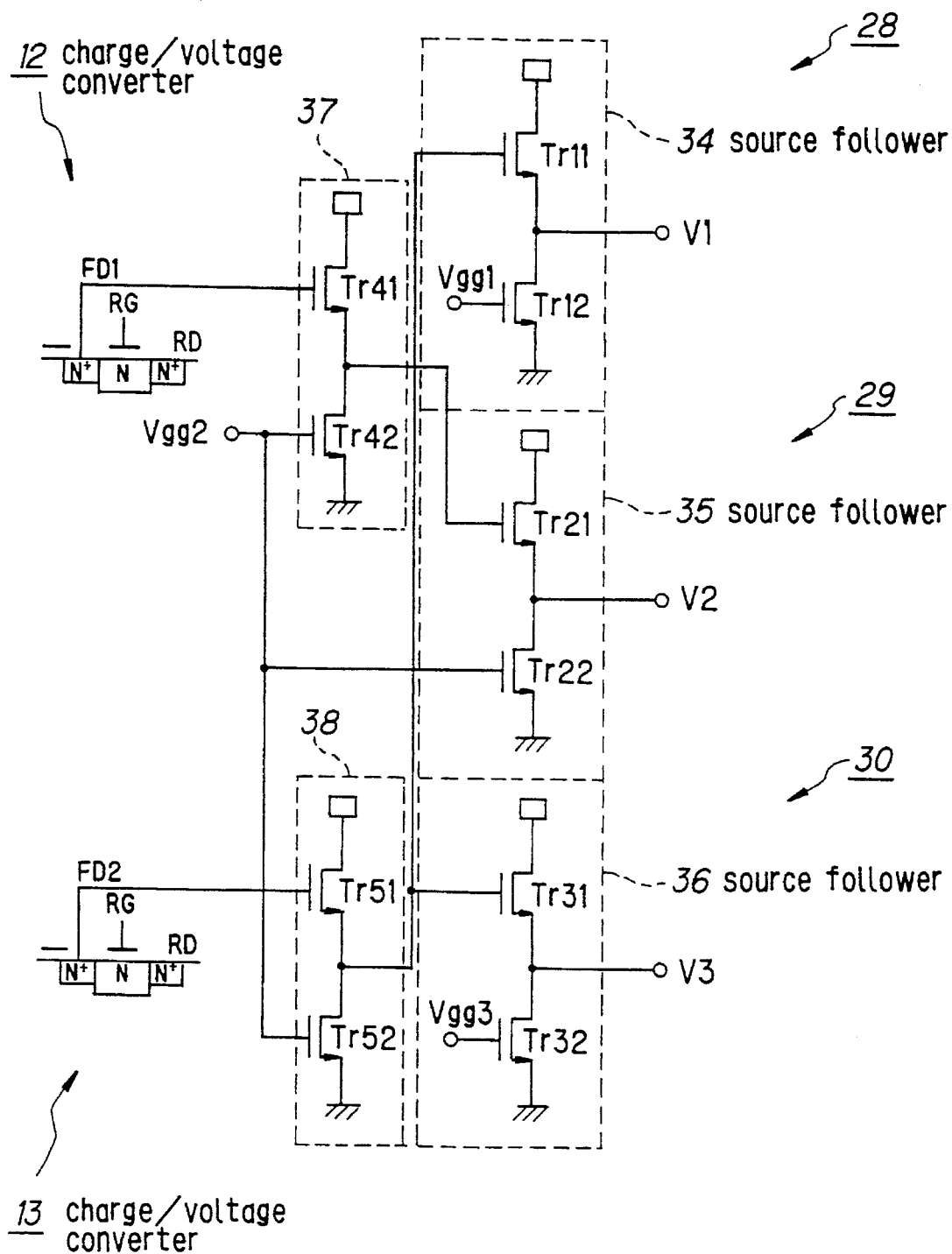
FIG. 16 is a circuit diagram showing an example of a buffer circuit structure.

FIG. 16 is a circuit diagram showing an example of the buffers 28, 29 and 30. As shown in the drawing, buffer 28 comprises a source follower circuit 34 consisting of two n-channel MOSFET's (hereinafter referred to simply as MOS transistors Tr11 and Tr12) connected in series across a power supply and earth, buffer 29 comprises a source follower circuit 35 consisting of two n-channel MOSFET's (hereinafter referred to simply as MOS transistors Tr21 and Tr22) connected in series across the power supply and earth and buffer 30 comprises a source follower circuit 36 consisting of two n-channel MOSFET's (hereinafter referred to simply as MOS transistors Tr31 and Tr32) connected in series across the power supply and earth.

Two source follower circuits 37 and 38 are provided at the pre-stages of the source follower circuits 34, 35 and 36.

The source follower circuit 37 is constructed from two n-channel MOSFET's (hereinafter referred to simply as MOS transistors Tr41 and Tr42) connected in series across the power supply and earth and the source follower circuit 38 is constructed from two n-channel MOSFET's (hereinafter referred to simply as MOS transistors Tr51 and Tr52) connected in series across the power supply and earth.

The gate of the MOS transistor Tr41 of the pre-stage source follower circuit 37 is connected to the FD1 (floating diffusion region) of the charge voltage converter 12 and the gate of the MOS transistor 51 of the source follower circuit 38 is connected to the FD2 of the charge/voltage converter 13.

The output terminal of the source follower circuit 37 is connected to the gate of the MOS transistor Tr21 of the source follower circuit 35. The output terminal of the source follower circuit 38 is connected to the gates of the MOS transistor Tr11 of the source follower 34 and the MOS transistor Tr31 of the source follower circuit 36.

A bias voltage Vgg1 is applied to the gate of the MOS transistor Tr12 of the source follower circuit 34. A bias voltage Vg2 is applied to the gates of the MOS transistor Tr22 of the source follower circuit 35, the MOS transistor Tr42 of the source follower circuit 37 and the MOS transistor Tr52 of the source follower circuit 38. Also, a bias voltage Vgg is applied to the gate of the MOS transistor Tr32 of the source follower circuit 36.

The first image-sense signal V1, second image-sense signal V2 and third image-sense signal V3 are then taken out as the output signals of the source follower circuit 34, the source follower circuit 35 and the source follower circuit 36 respectively.

Figure 17:
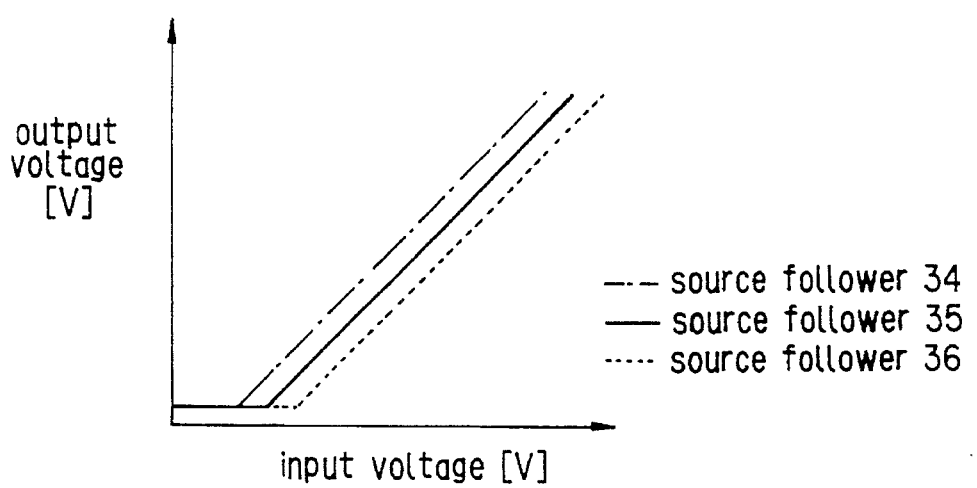
FIG. 17 is a characteristic diagram showing buffer input/output characteristics.

Bias voltages Vgg1, Vgg2 and Vgg3 of differing values may be given to the source follower circuits 34, 35 and 36 in the buffer circuits 28, 29 and 30 of the aforementioned structure so that the bias current flowing through each of the source follower circuits 34, 35 and 36 differ. The input characteristics (operating characteristics) of each of the buffers may therefore be changed, as shown in FIG. 17.

In this embodiment, the bias voltages Vgg1, Vgg2 and Vgg3 are set up so as to give a relationship where, for example, V11>V12>V13 when the offset levels of each of the outputs of the buffers 28, 29 and 30 have been made to be V11, V12 and V13.

Specifically, setting up is carried out so that V11=V12+Vx and V13=V12 −Vx when taking the offset level V12 as a reference and taking the weighting as Vx.

The signal levels of each of the first to third image-sense signals V1 to V3 can be changed by using the setting-up of the offset levels V11, V12 and V13. It is therefore no longer necessary for the comparators 17 and 18 to be unbalanced in the way that was necessary in the first embodiment.

According to the structure of the third embodiment as described above, by giving each of the buffers 28 to 30 different input/output characteristics, it is no longer necessary to make the comparators 17 and 18 unbalanced so that comparators 17 and 18 having the same characteristics may be used and the characteristics of the circuit overall may be stabilized.

Further, the input/output characteristics of each of the buffers 28 to 30 may be changed by adjusting the bias voltages Vgg1, Vgg2 and Vgg3. Binary sensitivity may therefore be adjusted because the value of the weighting Vx can easily be externally controlled.

Figure 18:
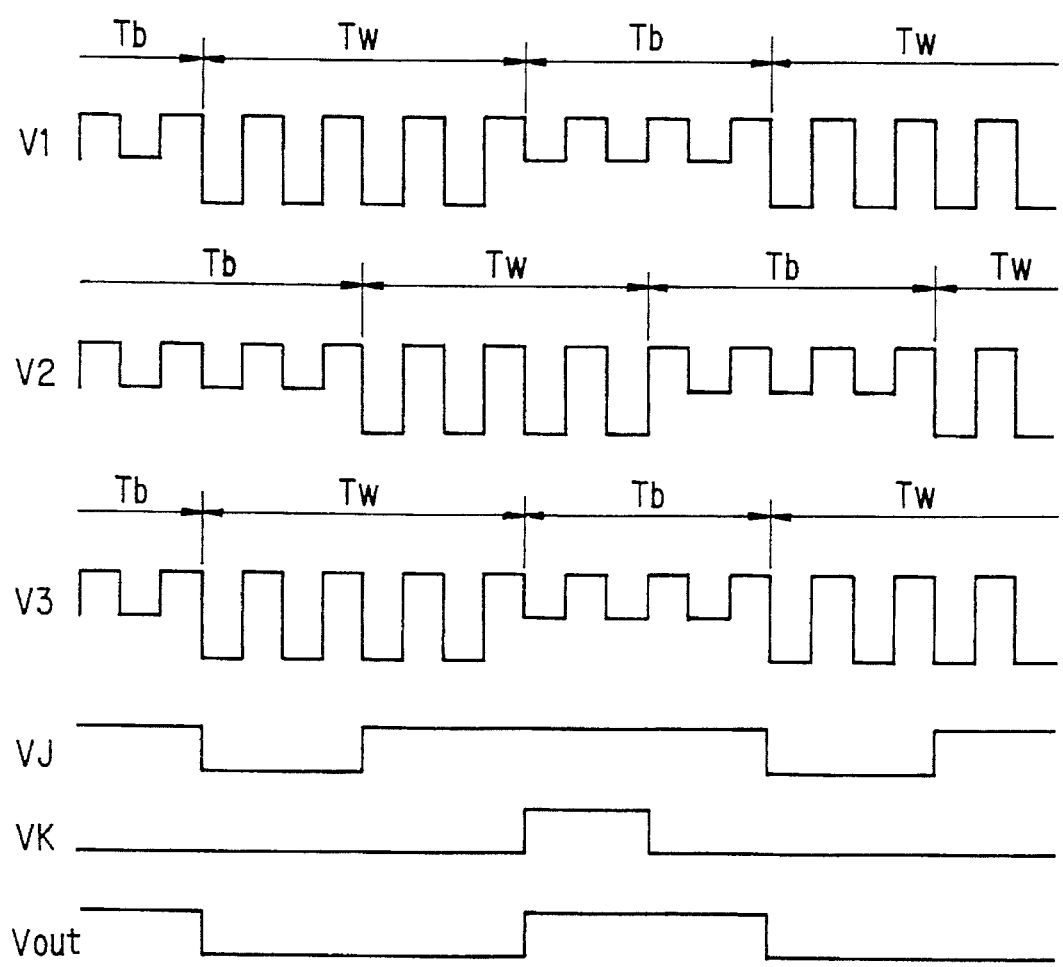
FIG. 18 is a signal waveform diagram for describing the operation of a third embodiment of the present invention.
Figure 19:
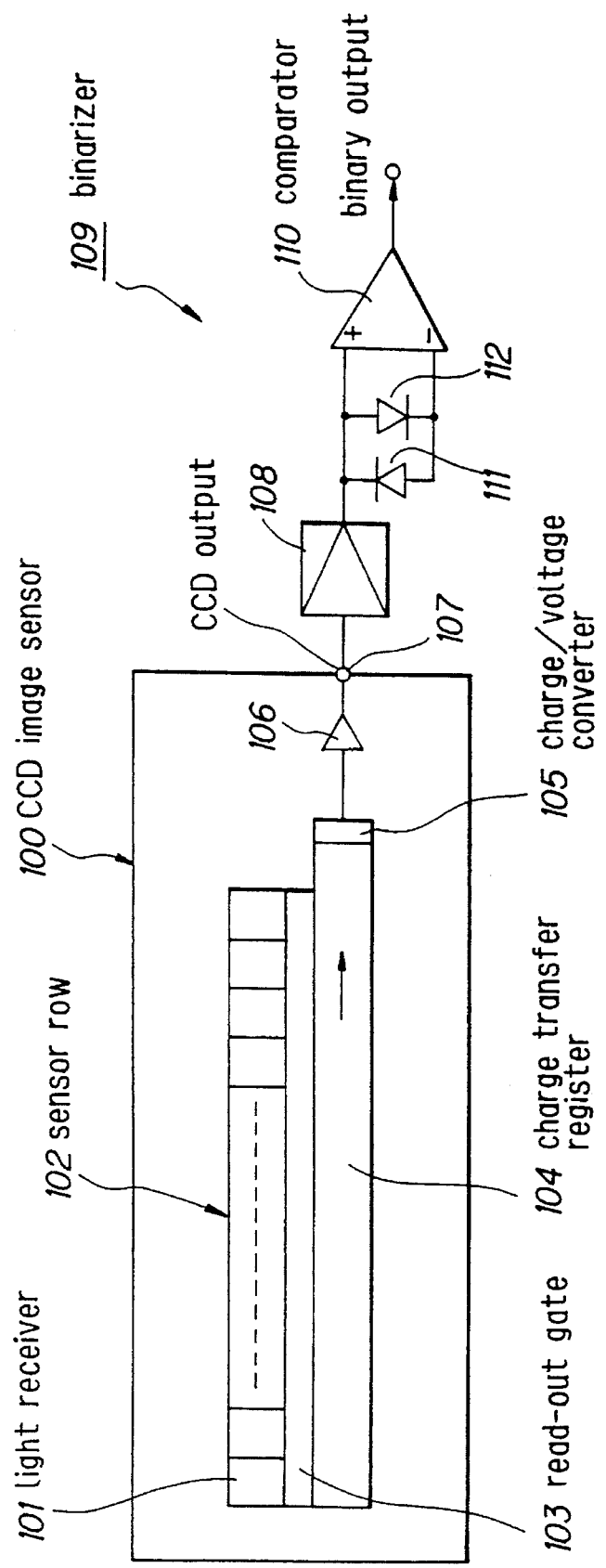
FIG. 19 is a structural view showing an example of a bar code reading device of the related art.
Figure 20:
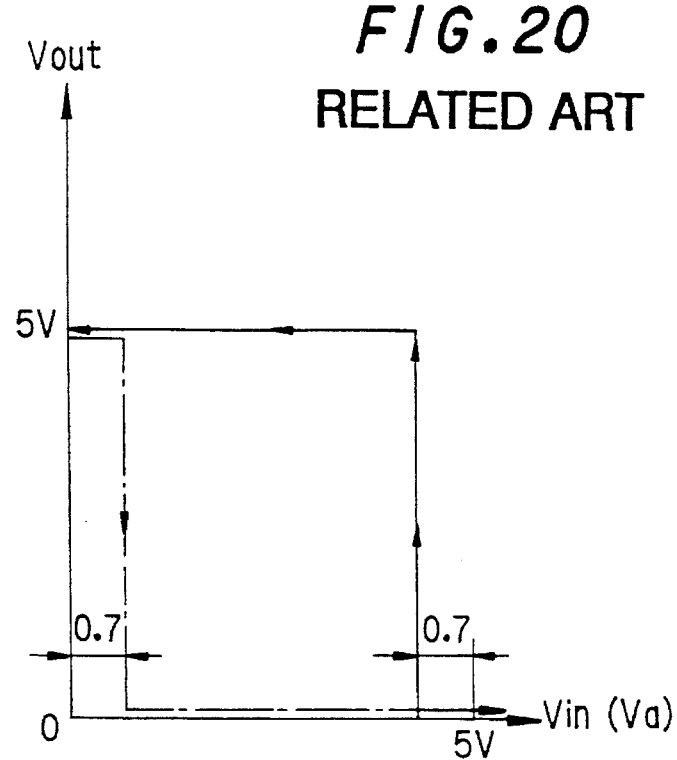
FIG. 20 is a characteristic diagram showing hysterisis characteristics of a related art binary circuit.

Next, the operation of the structure of the third embodiment will be described with reference to the signal waveform diagrams in FIG. 18.

First, in FIG. 15, the signal waveform of the second image-sense signal V2 taken from the charge/voltage converter 12 via the buffer 29 is delayed by two bits (i.e. two transfer clocks) with respect to the signal waveforms of the first and third image-sense signals V1 and V3 taken from the charge/voltage converter 13 via the buffer 28 and the buffer 30, respectively. The section Tb of these image-sense signals V1, V2 and V3 shows black information and the section Tw shows white information.

In this third embodiment, the output offset levels of each of the buffers 28, 29 and 30 are set up so that V11 (=V12+Vx )>V12>V13 (=V12–Vx ). The waveform of the output voltage VK of the comparator 17 therefore goes high only when the signal level of the second image-sense signal V2 falls below the signal level of the first image-sense signal V1 by an amount greater than the weighting Vx, and goes low at times other than this. This output voltage VK is inputted to the K terminal of the JK flip-flop 20.

On the other hand, the waveform of the output voltage VJ of the comparator 18 only goes low when the signal level of the second image-sense signal V2 falls below the signal level of the image-sense signal V3 by an amount greater than the weighting Vx, and goes high at other times. This output voltage VJ is inverted by the inverter 19 and inputted to the J terminal of the JK flip-flop circuit 20.

In this example, the output is unsettled when the + side input terminal and the – side input terminal are of the same potential because the comparators 17 and 18 posses the same characteristics.

With the output voltage VJ of the comparator 18 being high so that the J terminal input is low, when the output voltage VK of the comparator 17 goes high, the binary output Vout present at the output $Q_N$ of the JK flip-flop 20 goes high, and when the output voltage VJ of the comparator 18 goes low and the J terminal input goes high, the binary output Vout goes low.

As becomes clear by comparing the waveform V2 and the waveform Vout of FIG. 14, the binary voltage Vout outputted from the JK flip-flop circuit 20 is a binarized version of the second image-sense signal V2. Information corresponding to black and white read from the sensor row 3 of the CCD image sensor 1 can therefore be discerned to a high degree of precision based on this binary voltage Vout.

In this third embodiment, the giving of the weighting is carried out by changing the operating characteristics of each of the buffers 28, 29 and 30 by giving the source-follower circuits 34, 35 and 36 bias voltages Vgg1, Vgg2 and Vgg3 of different values. However, an equivalent weighting may also be attached by changing the size (W/L etc.) of the MOS transistors of the source follower circuits 34, 35 and 36 or providing amplifiers within the buffers 28, 29 or 30 and changing the operating point of each amplifier.

In each of the above embodiments, descriptions have been given for the case of application in a linear sensor. However, because the present invention involves charge transfer registers, charge/voltage converters, buffers and binary circuit comparators, the present invention is not limited to linear sensors and can also be applied to area sensors. Further, the present invention is not limited to solid-state image-sensing devices and may also be applied in the same way to delay elements of charge transfer devices.

Further, in each of the aforementioned embodiments, in the case where signal charge for the same pixel is split up between, for example, two systems, this has been carried out at a distribution ratio of 1:1, but it is by no means necessary to carry out the distribution equally and an arbitrary distribution ratio may be set up.

Also, with regards to the delay time difference, a time period corresponding to two bits has been adopted in each embodiment but a time period corresponding to one bit or three bits is also possible.

The solid-state image-sensing device of the present invention as structured in each of the aforementioned embodiments is applied to barcode reading devices for reading barcode information attached to mediums such as, for example, goods, and outputting this information as binary information.

Figure 21:
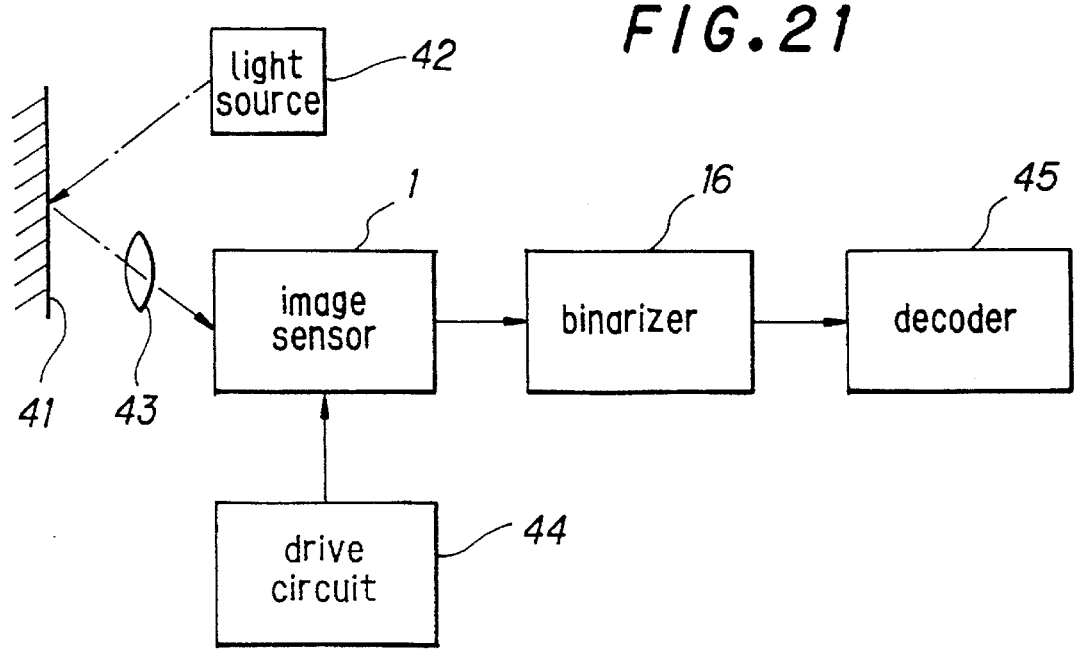
FIG. 21 is a structural view showing an example of a solid-state image-sensing device of the present invention applied to barcode reading device.

An example of the structure of a barcode reading device is shown in FIG. 21. In this drawing, a barcode (not shown in the drawing) attached to a medium 41 is illuminated by a light source 42 and then read by guiding the reflected light into an image sensor 1 via an optical system 43 such as a lens etc.

The structure described in each of the aforementioned embodiments may be used as the image sensor 1. i.e. a structure is adopted where signal charge accumulated at the same light receiving parts (pixels) 2 of the sensor part (sensor row 3) is taken as the signal charge for at least two systems and is transferred with there being a different number of transfer stages between each system so as to give a time difference between signal charges for the same pixel. These signal charges for at least two systems are then converted to voltages and outputted. This image sensor 1 is controllably driven by a driver circuit 44.

The output voltages of the at least two systems of the image sensor 1 are provided to the binary circuit 16 and binarized. The structure described for each of the aforementioned embodiments may also be used here as the binary circuit 16. i.e. the binary circuit may comprise comparators (comparators 17 and 18 and an inverter 19) for performing level comparisons on each of the output voltages from the image sensor 1 and a detector (the JK flip-flop 20) for detecting the transition points of the levels outputted by each of the comparators.

This binary signal is then decoded by a decoder 45 and finally outputted as read-out information.

In this way, by using the solid-state image-sensing apparatus of the present invention, it is possible to provide a bar-code reading device where the circuit structure of the solid-state image-sensing device in itself is simple, external parts are few, power consumption is low, the structure is highly noise resistant, compact and lightweight and moreover is capable of reading barcodes accurately.

Still further, the solid-state image-sensing apparatus of the present invention is by no means limited to applications in barcode reading devices and applications in, for example, simple facsimile machines etc. are also possible.

As described above, according to the present invention, by adopting a structure where signal charge for the same pixel is taken as signal charge for at least two systems and then transferred, with the number of transfer stages in each system being different and each signal charge being converted to a voltage at a charge/voltage converter and then being outputted, circuit systems of the charge/voltage converters can easily be positioned crosswise with respect to the charge/voltage converters and can therefore be formed "on-chip" on the same substrate as the image sensor.

A reducing of the number of parts and a lowering of the power consumption can be achieved because the image-sense signal binary information can be obtained using a circuit simple in structure and compatibility can be achieved when the operating power supply voltage is a low voltage because the circuit structure can be made sufficiently resistant to noise without using diodes.

What is claimed is:

1. A solid-state image-sensing device comprising:
    a sensor having a plurality of light-receiving portions arrayed, each light-receiving portion converting incident light into a signal charge corresponding to the amount of incident light and accumulating the signal charges;
    a charge transfer part for distributing between at least two systems the signal charge stored at one light-receiving portion part of the sensor and transferring the signal charge using different numbers of stages;
    a plurality of charge/voltage converters for detecting and converting into voltages the signal charges of the at least two systems transferred by the charge transfer part;
    a comparator for carrying out a level conversion on each of the outputs of the plurality of charge/voltage converters; and
    a detector for detecting the level transition point of the comparator output signal and generating a binary signal.

2. A solid-state image-sensing device according to claim 1, wherein the charge transfer part has a common transfer part for transferring signal charge read-out from the sensor, as is, in units for each light-receiving portion and first and second transfer parts for distributing between at least two systems and transferring the signal charge of one receiver transferred by the common transfer part.

3. A solid-state image-sensing device according to claim 1, wherein the comparator has a hysterisis characteristic.

4. A solid-state image-sensing device according to claim 1, wherein the plurality of charge/voltage converters are set up in such a manner that at least one reset potential differs from the remaining reset potentials.

5. A solid-state image-sensing device according to claim 1, wherein each reset potential of the plurality of charge/voltage converters can be independently adjusted.

6. A solid-state image-sensing device according to claim 1, further equipped with a plurality of buffers each having differing input/output characteristics for providing each of the output voltages of the plurality of charge/voltage converters to the comparator.

7. A solid-state image-sensing device according to claim 6, wherein each of the plurality of buffers are constructed using a source-follower circuit construction with the buffer voltages being set-up at mutually differing values.

8. A bar code reading device comprising:
    a light source; and
    an image sensor comprising;
        a sensor having a plurality light-receiving portions arrayed, with each light-receiving portion converting light, reflected when light is shone from the light source into a bar-code attached to a medium, into a signal charge corresponding to the amount of reflected light and accumulating the signal charges;
        a charge transfer part for distributing the signal charge stored at one light-receiving portion of the sensor between at least two systems and transferring the signal charge using different numbers of stages;
        a plurality of charge/voltage converters for detecting and converting into voltages the signal charges of the at least two systems transferred by the charge transfer part;
        a comparator for carrying out a level conversion on each of the outputs of the plurality of charge/voltage converters; and
        a detector for detecting the level transition point of the comparator output signal and generating a binary signal.

9. A bar-code reading device according to claim 8, wherein the charge transfer part has a common transfer part for transferring signal charge read-out from the sensor, as is, in units for each light-receiving portion and first and second transfer parts for distributing between at least two systems and transferring the signal charge of one light-receiving portion transferred by the common transfer part.

10. A bar-code reading device according to claim 8, wherein the comparator has a hysterisis characteristic.

11. A bar-code reading device according to claim 8, wherein the plurality of charge/voltage converters are set up in such a manner that at least one reset potential differs from the remaining reset potentials.

12. A bar-code reading device according to claim 8, wherein each reset potential of the plurality of charge/voltage converters can be independently adjusted.

13. A bar-code reading device according to claim 8, further equipped with a plurality of buffers each having differing input/output characteristics for providing each of the output voltages of the plurality of charge/voltage converters to the comparator.

14. A bar-code reading device according to claim 13, wherein each of the plurality of buffers are constructed using a source-follower circuit construction with the buffer voltages being set-up at mutually differing values.

* * * * *